(12) United States Patent
Kurata et al.

(10) Patent No.: US 9,128,224 B2
(45) Date of Patent: Sep. 8, 2015

(54) SURFACE LIGHT SOURCE DEVICE

(75) Inventors: Gouo Kurata, Tsurugashima (JP); Masayuki Shinohara, Nagaokakyou (JP)

(73) Assignee: OMRON Corporation, Kyoto (JP)

( * ) Notice: Subject to any disclaimer, the term of this patent is extended or adjusted under 35 U.S.C. 154(b) by 76 days.

(21) Appl. No.: 13/821,198

(22) PCT Filed: Mar. 9, 2012

(86) PCT No.: PCT/JP2012/056182
§ 371 (c)(1),
(2), (4) Date: Jul. 24, 2013

(87) PCT Pub. No.: WO2013/132661
PCT Pub. Date: Sep. 12, 2013

(65) Prior Publication Data
US 2014/0022814 A1  Jan. 23, 2014

(51) Int. Cl.
*F21V 8/00* (2006.01)
(52) U.S. Cl.
CPC ............ *G02B 6/0036* (2013.01); *G02B 6/0016* (2013.01); *G02B 6/0038* (2013.01); *G02B 6/0028* (2013.01); *G02B 6/0046* (2013.01)
(58) Field of Classification Search
USPC ......... 362/607, 620, 623, 625, 626, 628, 511, 362/223, 23.09, 23.07, 23.16, 615, 617, 619
See application file for complete search history.

(56) References Cited

U.S. PATENT DOCUMENTS

| | | | | |
|---|---|---|---|---|
| 7,001,058 B2* | 2/2006 | Inditsky | ........................ | 362/610 |
| 7,188,989 B2* | 3/2007 | Miyashita | ..................... | 362/621 |
| 7,697,813 B2* | 4/2010 | Lee et al. | ...................... | 385/146 |
| 7,808,576 B2* | 10/2010 | Takahashi et al. | .............. | 349/65 |
| 8,118,465 B2* | 2/2012 | Kunimochi et al. | .......... | 362/612 |
| 8,272,774 B2* | 9/2012 | Yi et al. | ......................... | 362/625 |
| 8,517,591 B2* | 8/2013 | Nakamoto et al. | ............ | 362/621 |
| 8,613,541 B2* | 12/2013 | Yu et al. | ........................ | 362/612 |
| 8,684,588 B2* | 4/2014 | Ajichi et al. | .................. | 362/628 |
| 8,827,530 B2* | 9/2014 | Chang et al. | .................. | 362/621 |

(Continued)

FOREIGN PATENT DOCUMENTS

| | | |
|---|---|---|
| EP | 2157365 A1 | 2/2010 |
| WO | 2008/153024 A1 | 12/2008 |
| WO | 2010/070821 A1 | 6/2010 |

OTHER PUBLICATIONS

International Search Report issued in PCT/JP2012/056182, mailed Jun. 19, 2012 (2 pages).

(Continued)

*Primary Examiner* — Ismael Negron
*Assistant Examiner* — Christopher E Dunay
(74) *Attorney, Agent, or Firm* — Osha Liang LLP

(57) ABSTRACT

A surface light source device has a light source, and a light guide plate introducing light of the light source from a light incidence surface and emitting the light from a light exit surface to outside. The light source being is provided at a position facing the light incidence surface of the light guide plate. The light guide plate includes a light introducing part for enclosing the light from the light source entering from the light incidence surface and a light guide plate main body having a thickness smaller than a maximum thickness of the light introducing part, provided so as to be continued to the light introducing part, and emitting the enclosed light from the light exit surface by light emitting portion to outside.

24 Claims, 34 Drawing Sheets

(56) References Cited

U.S. PATENT DOCUMENTS

| | | | |
|---|---|---|---|
| 8,827,532 B2* | 9/2014 | Wang et al. | 362/627 |
| 8,882,328 B2* | 11/2014 | Kinder | 362/628 |
| 8,894,266 B2* | 11/2014 | Ye et al. | 362/623 |
| 2009/0213619 A1* | 8/2009 | Nakamoto et al. | 362/621 |
| 2009/0256996 A1* | 10/2009 | Suzuki | 349/62 |
| 2010/0195019 A1* | 8/2010 | Shinohara et al. | 349/62 |
| 2011/0286237 A1 | 11/2011 | Tanoue et al. | |
| 2014/0241009 A1* | 8/2014 | Kunimochi | 362/628 |

OTHER PUBLICATIONS

Written Opinion issued in PCT/JP2012/056182, mailed Jun. 19, 2012 (3 pages).

* cited by examiner

PRIOR ART

PRIOR ART

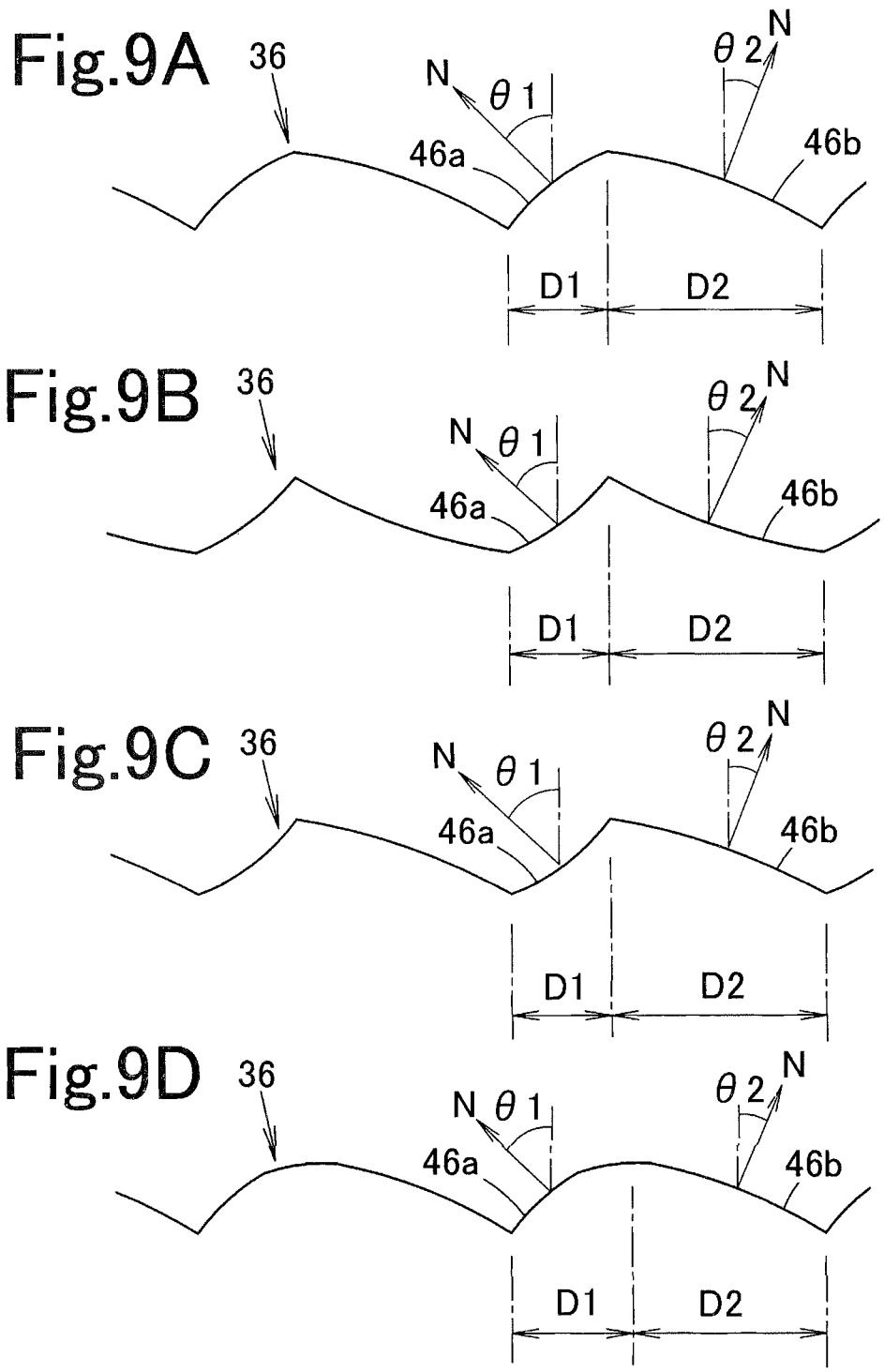

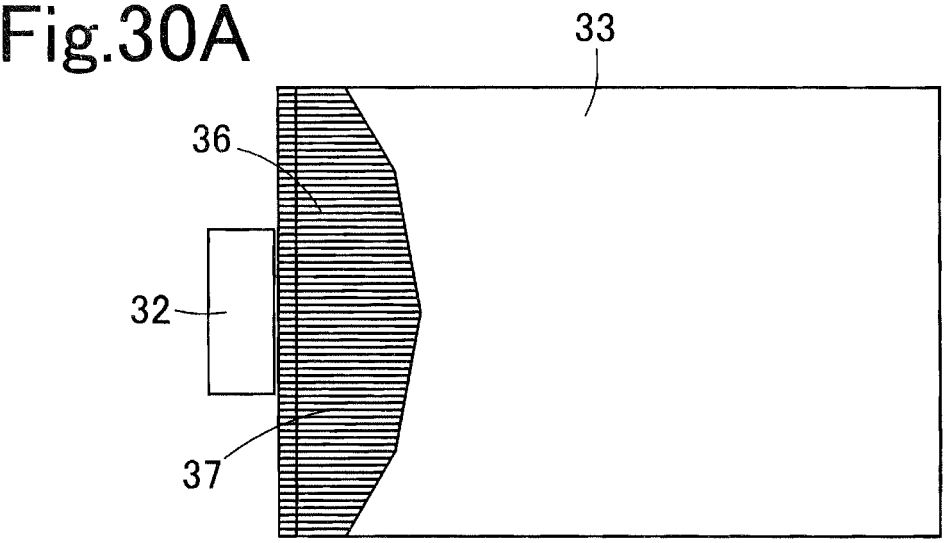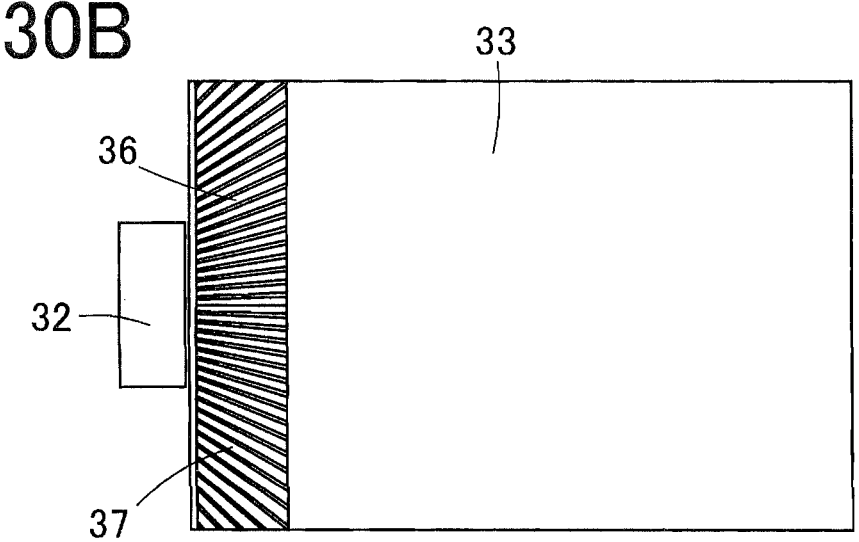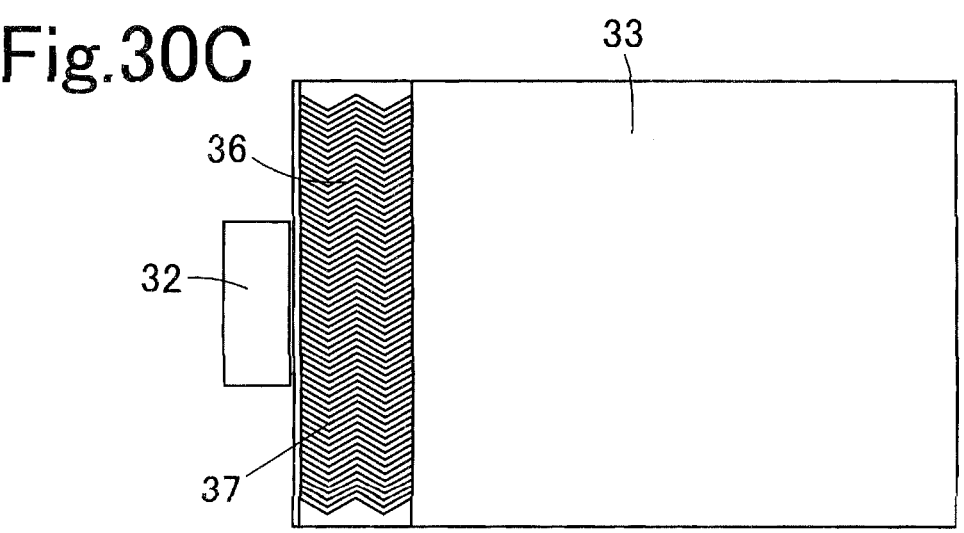

SURFACE LIGHT SOURCE DEVICE

BACKGROUND

1. Technical Field

The present invention relates to a surface light source device and, specifically, a surface light source device for use as a backlight of a liquid-crystal display or the like.

2. Background Art

In recent years, with mobile devices having a surface light source device incorporated therein being made thinner, the surface light source device has also been demanded to be made thinner. To make the surface light source device thinner, the thickness of a light guide plate is required to be made thinner. However, even if the thickness of the flat-plate-shaped light guide plate is able to be made thinner, decreasing the height of a light source formed of an LED has a limit. For this reason, when a thin light guide plate in a flat plate shape is used, the height of the light source is larger than the thickness of an end face (a light incidence surface) of the light guide plate, thereby causing the light source placed so as to face the light incidence surface of the light guide plate to project above an upper surface of the light guide plate. With this projection of the light source above the light guide plate, rays emitted from the light source do not all enter the light incidence surface of the light guide plate, and partially leak to the outside to degrade light use efficiency.

To solve these inconveniences, the use of a light guide plate has been suggested, in which a light introducing part having a thickness larger than a light guide plate main body is provided at an end of the flat-plate-shaped light guide plate main body and an inclined surface inclined from a portion with a maximum thickness of the light introducing part toward an end of the light guide plate main body is provided to the light introducing part. Examples of a surface light source device using this light guide plate include those disclosed in Patent Document 1 and Patent Document 2.

FIG. 1 is a perspective view of a surface light source device 11 disclosed in Patent Document 1. In the surface light source device 11 of FIG. 1, a light guide plate having a light introducing part with a thickness larger than that of a light guide plate main body is used. This surface light source device 11 is formed of a light source 12 and a light guide plate 13, and the light source 12 is placed so as to face a light incidence surface 16 of the light guide plate 13. The light incidence surface has a thickness larger than the height of the light source 12. The light guide plate 13 is fabricated by integrally forming a light guide plate main body 14 having an approximately uniform thickness and a wedge-shaped light introducing part 15. On a rear surface of the light guide plate main body 14, a deflection pattern or a diffusion pattern (not shown) is formed. The light introducing part 15 has an inclined surface 17 inclined from a portion with a maximum thickness of the light introducing part 15 toward an end of the light guide plate main body 14. Also, on the inclined surface 17 of the light introducing part 15, a directional conversion pattern 18 (a light leakage prevention pattern) formed of a plurality of parallel V grooves is provided.

In this surface light source device 11, light emitted from the light source 12 enters the light introducing part 15 from the light incidence surface 16. An end face (the light incidence surface 16) of the light introducing part 15 has a thickness larger than the height of the light source 12, and therefore light emitted from the light source 12 is efficiently taken into the light introducing part 15. The light entering the light introducing part 15 is reflected from an upper surface or a lower surface of the light introducing part 15 to be guided to the light guide plate main body 14, is reflected from the deflection pattern or the diffusion pattern, and is then emitted from a light exit surface of the light guide plate main body 14 to the outside. Here, part of light entering the light introducing part 15 from the light incidence surface 16 may not be reflected from the inclined surface 17 to pass through the inclined surface 17 to leak to the outside. For this reason, the directional conversion pattern 18 is provided to the inclined surface 17, thereby decreasing light leakage from the inclined surface 17. As a result, according to the above-structured surface light source device 11, it is possible to improve light use efficiency and also make the surface light source device thinner.

However, in the surface light source device 11 provided with the thick light introducing part 15 so as to be continued to the thin light guide plate main body 14, even if the directional conversion pattern 18 formed of a plurality of V grooves is provided, light leakage occurs as depicted in FIG. 2 (rays leaking to the outside among rays entering the light introducing part 15 are indicated by broken arrows). FIG. 2 is a schematic plan view of the state in which light leakage occurs from the surface light source device 11. In FIG. 2, light L1 represents a ray emitted from a center of light emission of the light source 12, light L2 represents a ray emitted from an end of the light source 12, and a straight line C represents a light source center. The light L1 emitted from a center of light emission 12a has a light intensity high compared with that of the light L2 emitted from an end of the light source 12. FIG. 3 is a schematic view of behaviors of the light L1 with a high light intensity emitted from the center of light emission 12a. Of rays emitted from the center of light emission 12a, the light L1 emitted from the center of light emission 12a upward is reflected from the directional conversion pattern 18 as with light L11, and therefore is less prone to leakage from the inclined surface 17. By contrast, in the conventional surface light source device 11, as depicted in FIG. 3, V grooves of the same shape each having a laterally symmetrical sectional shape are repeatedly arranged in the directional conversion pattern 18, and therefore the light L1 emitted from the center of light emission 12a in a slanting direction is prone to leaking to the outside as the light L2. That is, as the position where light enters the directional conversion pattern 18 is away from the light source center C, the light L1 gradually becomes entering a front surface of the directional conversion pattern 18 at a nearly vertically angle, and becomes prone to leaking from the directional conversion pattern 18. As a result, light leakage from the directional conversion pattern 18 in a region equal to a width W of the light source 12 (not a width of a package of the light source 12 but a width of a light exit window), in particular, in its side end part, tends to be increased, and light loss is increased.

Note that while a pattern corresponding to a directional conversion pattern is formed over an entire width of a light introducing part in the surface light source device described in Patent Document 2, light of the light source shows an approximately Lambert distribution and the light intensity is small in a direction of a large angle with respect to the front, and therefore light leakage from a side end of the light guide plate does not pose much problems. Thus, even if the directional conversion pattern is provided from one side end to the other side end of the light guide plate, light leakage poses a problem only in a region approximately equal in width to the light source.

PATENT DOCUMENTS

[Patent Document 1] International Publication No. 2010/070821

[Patent Document 2] WO2008-153024

SUMMARY

One or more embodiments of the present invention makes light less prone to leaking from an directional conversion pattern in a surface light source device with an inclined plane at a light introducing part of a light guide plate.

A surface light source device according to one or more embodiments of the present invention includes a light source, and a light guide plate introducing light of the light source from a light incidence surface and emitting the light from a light exit surface to outside. The light source is provided at a position facing the light incidence surface of the light guide plate. The light guide plate comprises a light introducing part for enclosing the light from the light source entering from the light incidence surface and a light guide plate main body having a thickness smaller than a maximum thickness of the light introducing part, provided so as to be continued to the light introducing part, and emitting the enclosed light from the light exit surface by a light emitting portion to outside. The light introducing part comprises an inclined surface inclined from a surface of a portion having a thickness larger than a thickness of the light guide plate main body toward an end of a surface of the light guide plate main body, the inclined surface being provided on at least one of a surface of the light guide plate on a light emission side and a surface opposite thereto. The light guide plate comprises a directional conversion pattern for converting a directional spread of the light entering the light introducing part in a thickness direction of the light guide plate into a directional characteristic inclined to a direction parallel to a surface direction of the light guide plate, the directional conversion pattern being provided on at least one of the surface of the light guide plate on the light emission side and the surface opposite thereto. The directional conversion pattern is configured so that ridge lines and valley lines are alternately repeated along a width direction of the light guide plate. Of a cross-section of the directional conversion pattern obtained by cutting in parallel to the light incidence surface, in a portion positioned in front of the light source and in a region having a width equal to a width of the light source, an inclined surface connecting any ridge line of the ridge lines of the directional conversion pattern and one valley line adjacent to the ridge line and an inclined surface connecting the ridge line and another valley line adjacent to the ridge line being asymmetrical with respect to a straight line passing though the ridge line and perpendicular to the light exit surface, and at least one set of the asymmetrically-shaped portions of different shapes being present on both sides of a light source center, and in each of both sides of the light source center, when a normal is set on an inclined surface connecting adjacent ridge line and valley line of the directional conversion pattern from inside to outside of the light guide plate, a total sum of breadths of inclined surfaces each with the normal inclined to a light source center side is larger than a total sum of breadths of inclined surfaces each with the normal inclined to a side opposite to the light source center. Here, the light source center is a plane passing through a light emission center of the light source and perpendicular to the light incidence surface and the light exit surface of the light guide plate. Also, the inclined surface of the directional conversion pattern is a surface inclined between a ridge line and a valley line of the directional conversion pattern, and may be a flat surface or a curved surface.

In the surface light source device according to one or more embodiments of the present invention, since the inclined surfaces connecting a ridge line and valley lines positioned on both sides thereof of the directional conversion pattern are asymmetrical, restrictions on designing the directional conversion pattern are mild, light leakage from the directional conversion pattern can be decreased, and light use efficiency can be improved.

In a surface light source device according to one or more embodiments of the present invention, the total sum of the breadths of inclined surfaces of the directional conversion pattern refers to a total of breadths of the respective inclined surfaces of the directional conversion pattern in each of both sides of the light source center (that is, widths in a direction parallel to the light incidence surface). Light reaching from the light source is prone to leakage from an inclined surface with the normal inclined to the side opposite to the light source center (hereinafter, outward normal inclined surface) more than an inclined surface with the normal inclined to the light source center side (hereinafter, an inward normal inclined surface). In the directional conversion pattern, since the total sum of the breadths of the outward normal inclined surfaces is smaller than the total sum of the breadths of the inward normal inclined surfaces, the area of the outward normal inclined surfaces prone to light leakage is narrow as a whole, and thus light leakage from the directional conversion pattern can be suppressed and light use efficiency can be improved.

In one or more of the embodiments of the present invention, in the adjacent two inclined surfaces, a breadth of an inclined surface with the normal inclined to the light source center side is desirably larger than or equal to a breadth of an inclined surface with the normal inclined to the side opposite to the light source center.

According to this mode, since the breadth of the outward normal inclined surface is smaller than the breadth of the inward normal inclined surface, the area of the outward normal inclined surface prone to light leakage is narrow, and thus light leakage from each pattern element included in the directional conversion pattern can be suppressed and light use efficiency can be improved.

In one or more embodiments of the present invention, a ratio of the breadths of the inclined surfaces each with the normal inclined to the side opposite to the light source center with respect to the sum of the breadths of the adjacent two inclined surfaces is desirably decreased or equal as a distance from the light source center is increased.

According to this mode, light leakage can be more decreased, and light use efficiency can be further improved.

Furthermore, in one or more of the embodiments of the present invention, when $A=-0.456\times B+\alpha$ where a ratio of breadth of the inclined surface with the normal inclined to the side opposite to the light source center with respect to the sum of the breadths of the adjacent two inclined surfaces is A, and a ratio of distance of the adjacent two inclined surfaces from the light source center with respect to ½ of an open width of the light source is B, a value of the $\alpha$ is desirably in a range of $0.3 \leq \alpha \leq 0.9$.

According to this mode, light use efficiency can be increased more than the case of using a directional conversion pattern with adjacent inclined surfaces having a symmetrical shape.

A surface light source device according to one or more embodiments of the present invention includes a light source, and a light guide plate introducing light of the light source from a light incidence surface and emitting the light from a light exit surface to outside. The light source is provided at a position facing the light incidence surface of the light guide plate. The light guide plate comprises a light introducing part for enclosing the light from the light source entering from the light incidence surface and a light guide plate main body having a thickness smaller than a maximum thickness of the light introducing part, provided so as to be continued to the light introducing part, and emitting the enclosed light from the light exit surface by a light emitting portion to outside. The light introducing part comprises an inclined surface inclined from a surface of a portion having a thickness larger than a thickness of the light guide plate main body toward an end of a surface of the light guide plate main body, the inclined surface being provided on at least one of a surface of the light guide plate on a light emission side and a surface opposite thereto. The light guide plate comprises a directional conversion pattern for converting a directional spread of the light entering the light introducing part in a thickness direction of the light guide plate into a directional characteristic inclined to a direction parallel to a surface direction of the light guide plate, the directional conversion pattern being provided on at least one of the surface of the light guide plate on the light emission side and the surface opposite thereto. The directional conversion pattern is configured so that ridge lines and valley lines are alternately repeated along a width direction of the light guide plate. Of a cross-section of the directional conversion pattern obtained by cutting in parallel to the light incidence surface, in a portion positioned in front of the light source and in a region having a width equal to a width of the light source, an inclined surface connecting any ridge line of the ridge lines of the directional conversion pattern and one valley line adjacent to the ridge line and an inclined surface connecting the ridge line and another valley line adjacent to the ridge line being asymmetrical with respect to a straight line passing though the ridge line and perpendicular to the light exit surface, and at least one set of the asymmetrically-shaped portions of different shapes being present on both sides of a light source center, in each of both sides of the light source center, when a normal is set on an inclined surface connecting adjacent ridge line and valley line of the directional conversion pattern from inside to outside of the light guide plate, an average angle of angles each formed by the normal inclined to the light source center side and a direction perpendicular to the light exit surface is smaller than an average angle of angles each formed by the normal inclined to the side opposite to the light source center and a direction perpendicular to the light exit surface. In the directional conversion pattern of this mode, the average angle of the angles each formed by the normal inclined to the light source center side and the direction perpendicular to the light exit surface (hereinafter, inward normal angles) is smaller than the average angle of the angles each formed by the normal inclined to the side opposite to the light source center and the direction perpendicular to the light exit surface (hereinafter, outward normal angles). Therefore, the outward normal angles are increased, and the tilt angles of the outward normal inclined surface are increased as a whole. For this reason, the angle of incidence when light reaching from the light source enters the outward normal inclined surface is increased, and light is less prone to leaking from the outward normal inclined surface. Thus, light leakage from the directional conversion pattern can be suppressed, and light use efficiency can be improved.

In one or more embodiments of the present invention, in the two adjacent inclined surfaces, an angle formed by the normal inclined to the light source center side and the direction perpendicular to the light exit surface is desirably smaller than or equal to an angle formed by the normal inclined to the side opposite to the light source center and the direction perpendicular to the light exit surface.

According to this mode, of two inclined surfaces included in the directional conversion pattern (pattern elements), the tilt angle of the outward normal inclined surface is increased, and therefore the angle of incidence when the light reaching from the light source enters the outward normal inclined surface is increased, and light is less prone to leaking from the outward normal inclined surface.

Furthermore, in one or more of the embodiments of the present invention, an angle formed by the normal inclined to the light source center side and the direction perpendicular to the light exit surface is desirably decreased or equal as a distance from the light source center is increased.

According to this mode, light leakage can be further decreased, and light use efficiency can be further improved.

In one or more embodiments of the present invention, an angle formed by the normal inclined to the side opposite to the light source center and the direction perpendicular to the light exit surface is desirably increased or equal as a distance from a light source center is increased.

According to this mode, light leakage can be further decreased, and light use efficiency can be further improved.

In one or more embodiments of the present invention, when $C=\pm 0.391 \times B + \beta$ where a ratio of difference obtained by subtracting the angle formed by the normal inclined to the light center side among the normal of the adjacent two includes surfaces and the direction perpendicular to the light exit surface from the angle formed by the normal inclined to the side opposite to the light source center among the normal of the adjacent two inclined surfaces and the direction perpendicular to the light exit surface, with respect to a sum of the angle formed by the normal inclined to the side opposite to the light source center among the normal of the adjacent two includes surfaces and the direction perpendicular to the light exit surface and the angle formed by the normal inclined to the light source center side among the normal of the adjacent two includes surfaces and the direction perpendicular to the light exit surface is C, and a ratio of distances of the two inclined surfaces from the light source center with respect to ½ of an open width of the light source is B, a value of the $\beta$ is desirably in a range of $$-0.33 \leq \beta \leq 0.17.$$

According to this mode, light use efficiency can be increased more than the case of using a directional conversion pattern with adjacent inclined surfaces having a symmetrical shape A surface light source device according to one or more embodiments of the present invention is characterized in that the directional conversion pattern has a plurality of pattern elements arranged along the width direction of the light guide plate. In each region on both sides of the light source center, the pattern elements convert a directional characteristic of light by reflecting light into the light guide plate so that quantity of light oriented to the side opposite to the light source center after reflection is more than before reflection. According to this mode, light leakage can be further decreased, and light use efficiency can be further improved.

A surface light source device according to one or more embodiments of the present invention is characterized in that, in regions on both sides of the light source center, a sum of an angle formed by the normal inclined to the light source center side and the direction perpendicular to the light exit surface and an angle formed by the normal inclined to the side opposite to the light source center and the direction perpendicular to the light exit surface is equal to or larger than 35° and equal to or smaller than 123 °.

If this condition is satisfied, light leakage can be decreased more than the case of using a directional conversion pattern with adjacent inclined surfaces having a symmetrical shape, and light use efficiency can be increased.

A surface light source device according to one or more embodiments of the present invention is characterized in that the directional conversion pattern is configured of a plurality of V-grooved pattern elements.

Accordingly, the light guide plate can be easily manufactured.

A surface light source device according to one or more embodiments of the present invention is characterized in that every vertical angle of all ridge line portions formed between the adjacent two V-grooved pattern elements is the same.

Accordingly, when a metal mold for molding a light guide plate is processed with V grooves, it is sufficient that V grooves are sequentially formed in the process while a tool for V-groove processing is inclined to change the angle, thereby easily manufacturing a metal mold.

A surface light source device according to one or more embodiments of the present invention is characterized in that a plurality of the light sources are placed at positions facing the light incidence surface and arranged along the light incidence surface with a space P, and when a refractive index of the light guide plate is n, the directional conversion pattern is present in a region of the light guide plate at a distance equal to or shorter than P/[2−arcsin(1/n)] from a light exit side end face of the light source.

This is because, if the region where the directional conversion pattern is formed extends farther than P/[2−arcsin(1/n)] from the light exit side end face of the light source, light emitted from a light source enters a region in front of the light source to degrade light use efficiency instead.

A surface light source device according to one or more embodiments of the present invention is characterized in that a plurality of the light sources are placed at positions facing the light incidence surface, and the directional conversion pattern is cyclically configured with an approximately center between adjacent ones of the light sources being taken as a boundary. Accordingly, the light guide plate can be easily manufactured.

A surface light source device according to one or more embodiments of the present invention is characterized in that, when viewed in a direction perpendicular to the light exit surface, the directional conversion pattern is configured of a plurality of pattern elements aligned in parallel. Accordingly, the light guide plate can be easily manufactured.

Note that embodiments of the present invention may include features obtained by combining the component described above as appropriate and many variations are possible by combining the components in this manner.

BRIEF DESCRIPTION OF DRAWINGS

FIG. 9A to FIG. 9D are schematic views of modification examples of the directional conversion pattern depicted in FIG. 7.

FIG. 30A to FIG. 30C are schematic plan views of various directional conversion patterns.

Figure 1:
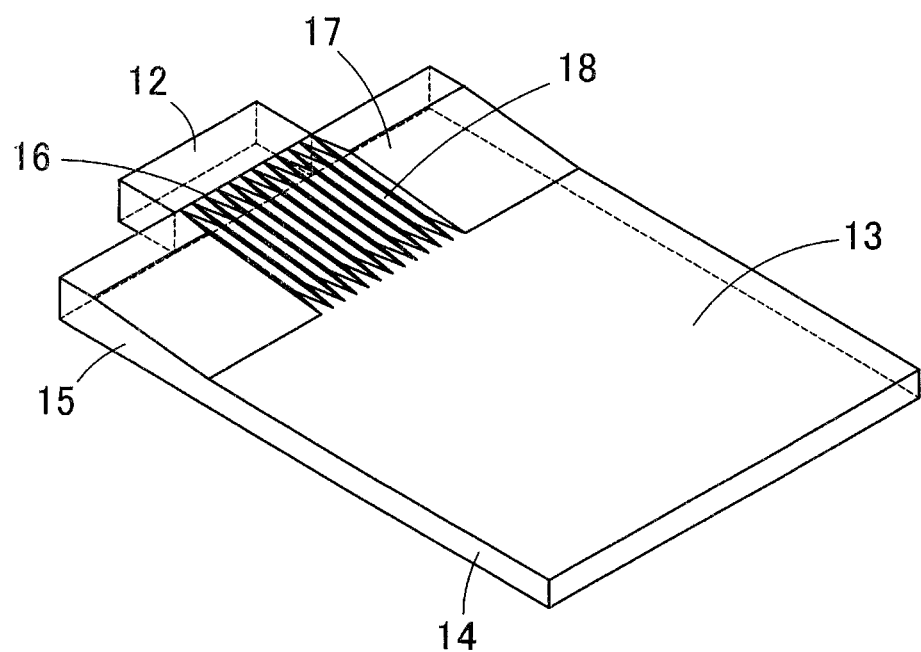
FIG. 1 is a perspective view of a surface light source device described in Patent Document 1.
Figure 2:
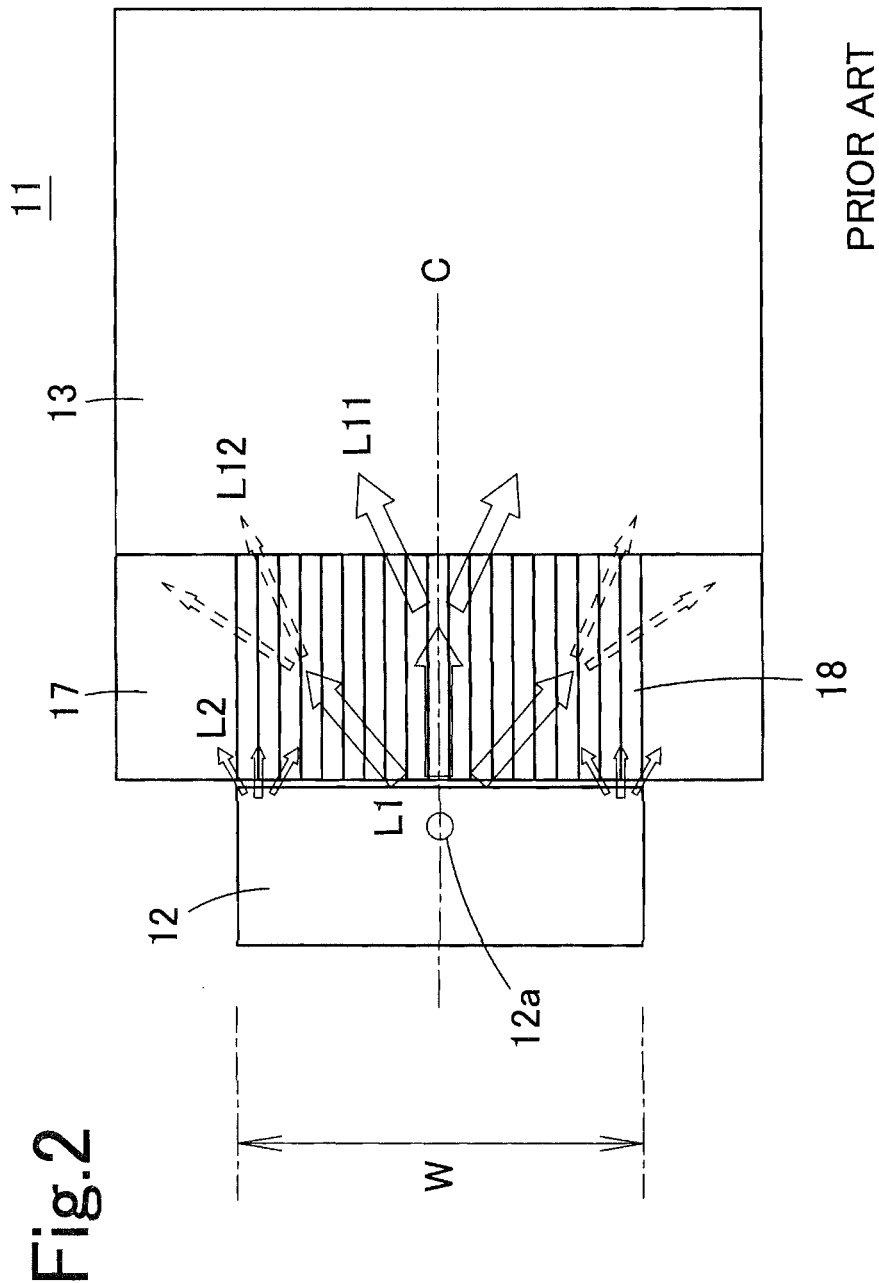
FIG. 2 is a schematic plan view for describing the state in which light leaks from the surface light source device described in Patent Document 1.

DESCRIPTION OF REFERENCE CHARACTERS 31, 51 surface light source device
32 point source of light
32a center of light emission
33 light guide plate
34 light guide plate main body
35 light introducing part
36 directional conversion pattern
37 inclined surface
38 light incidence surface
46a, 46b pattern inclined surface
C light source center
D1, D2 breadth of a pattern inclined surface
θ1, θ2 angle with respect to the normal
θm1, θm2 average angle of the normal

DETAILED DESCRIPTION

Embodiments of the present invention are described below with reference to the attached drawings. However, the present invention is not restricted to the embodiments below and can be variously changed in design within a range not deviating from the gist of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Basic Structure of Surface Light Source Device)

Figure 4:
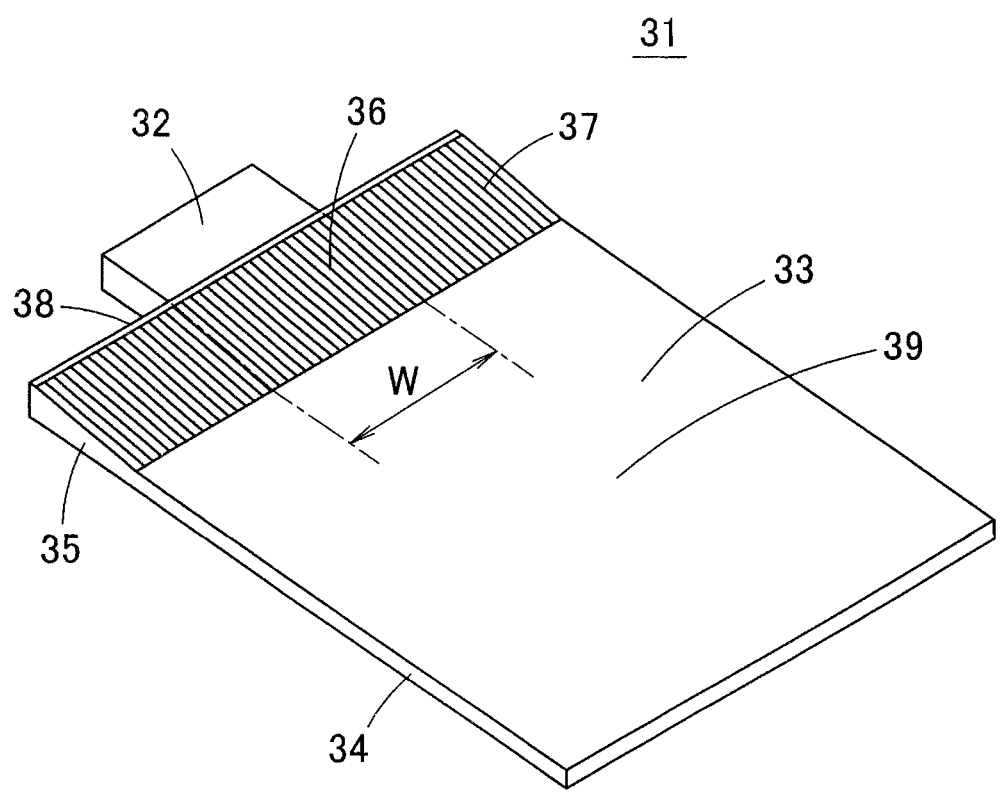
FIG. 4 is a perspective view of a surface light source device according to one or more embodiments of the present invention.
Figure 5:
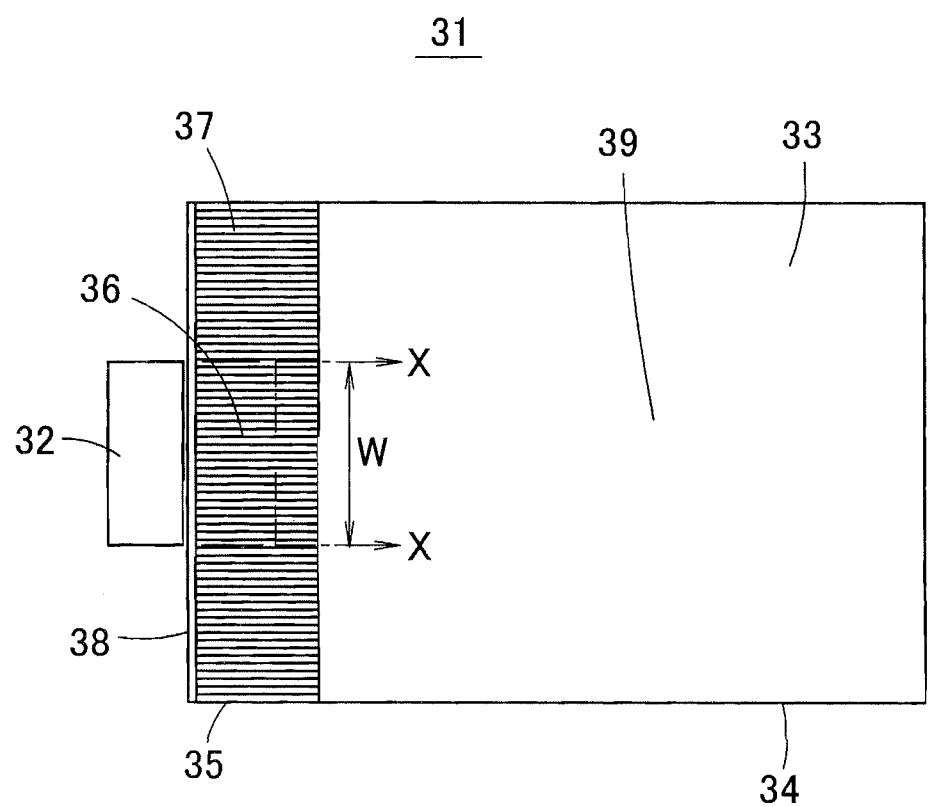
FIG. 5 is a plan view of the surface light source device depicted in FIG. 4.
Figure 6:
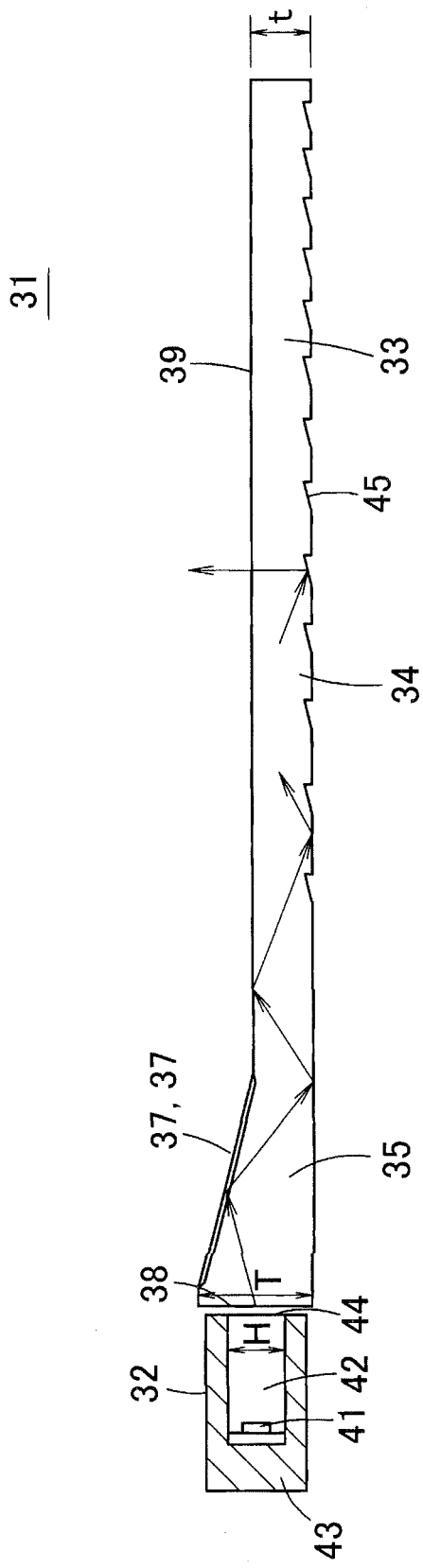
FIG. 6 is a schematic sectional view of the surface light source device depicted in FIG. 4.

The basic structure of a surface light source device 31 according to one or more embodiments of the present invention is described below with reference to FIG. 4 to FIG. 6. FIG. 4 is a perspective view of the surface light source device 31 according to one or more embodiments of the present invention. FIG. 5 is a plan view of the surface light source device 31. FIG. 6 is a schematic sectional view of the surface light source device 31 in a direction perpendicular to a light incidence surface 38.

The surface light source device 31 is formed of a point source of light 32 (a light source) and a light guide plate 33. The point source of light 32 has one or a plurality of LEDs incorporated therein, and emits white light. As depicted in FIG. 6, an LED 41 is sealed in a transparent sealing resin 42 and, furthermore, the transparent sealing resin 42 except its front surface is covered with a white resin 43. The transparent sealing resin 42 exposed from the white resin 43 has a front surface serving as a light exit window 44 (a light-emitting surface). This point source of light 32 is small compared with the width of the light guide plate 33, and is called a point source of light, as opposed to a cold-cathode tube being called a linear light source.

In the light guide plate 33, a light introducing part 35 is provided at an end face of a light guide plate main body 34 so as to be continued to the thin-plate-shaped light guide plate main body 34. The light guide plate 33 is integrally molded with a transparent resin with a high refractive index such as an acrylic resin, a polycarbonate resin (PC), a cycloolefin-based resin, or polymethyl methacrylate (PMMA).

The light introducing part 35 is a thick portion of the light guide plate 33 having a substantially wedge shape, and the point source of light 32 is placed so as to face a part of the light incidence surface 38, which is an end face of the light introducing part 35. The end face of the light introducing part 35 has a thickness T equal to or thicker than a height of the light exit window 44. Therefore, light emitted from the point source of light 32 efficiently enters from the light incidence surface 38 into the light introducing part 35, thereby increasing light use efficiency of the surface light source device 31.

The light introducing part 35 has an upper surface (a surface on the same side as a light exit surface 39 of the light guide plate main body 34) on which an inclined surface 37 is formed. The inclined surface 37 is inclined from a portion having a maximum thickness near the light incidence surface 38 toward an end of the light guide plate main body 34. The inclined surface 37 extends in a band shape from one end side to the other end side of the light guide plate 33.

As depicted in FIG. 4 and FIG. 5, the inclined surface 37 has a directional conversion pattern 36 formed thereon. In the directional conversion pattern 36, a plurality of mount-shaped or V-grooved pattern elements are arranged along a width direction of the light guide plate 33. That is, in the directional conversion pattern 36, ridge lines and valley lines are alternately arranged. When this directional conversion pattern 36 is viewed from a direction perpendicular to the light exit surface 39, the pattern elements, or the ridge lines and valley lines, are placed in parallel to the direction perpendicular to the light incidence surface 38 and arranged in parallel to each other along the width direction of the light guide plate 33. The pattern elements each have a section parallel to the light incidence surface 38, the section having a laterally asymmetrical shape. In regions on both sides of the light source center, at least one set of asymmetrical pattern elements has different shapes. This directional conversion pattern 36 has a function of converting the directional spread of light entering the light introducing part 35 in a thickness direction of the light guide plate into a directional characteristic inclined toward a direction parallel to a surface direction of the light guide plate 33.

The light guide plate main body 34 occupies most of the area of the light guide plate 33 and, as depicted in FIG. 6, has a thickness t thinner than the maximum thickness T of the light introducing part 35, thereby making the light guide plate 33 thinner. The light guide plate main body 34 has a flat-plate shape with its front and rear surfaces parallel to each other, and the thickness of the light guide plate main body 34 is approximately uniform.

On a surface (a lower surface) opposite to the light exit surface 39 of the light guide plate main body 34, light exit means 45 is provided. While a triangular-groove-shaped pattern is depicted as the light exit means 45 in FIG. 6, a pattern subjected to sandblasting, a pattern obtained by photoprinting diffusion ink, a diffraction grating pattern, any recess or projection pattern, or others may be used, and this pattern may be provided to the light exit surface 39 of the light guide plate main body 34, or both of the light exit surface 39 and the surface opposite to the light exit surface 39.

Thus, in this surface light source device 31, as indicated by arrows in FIG. 6, light emitted from the point source of light 32 enters the light introducing part 35 from the light incidence surface 38, and is reflected from an upper surface or lower surface of the light introducing part 35 or passes through the light introducing part 35 to be guided to the thin light guide plate main body 34. The light introduced to the light guide plate main body 34 is guided inside the light guide plate main body 34 as being reflected from the upper surface and the lower surface of the light guide plate main body 34, is reflected or diffused by the light exit means 45 to be emitted approximately uniformly from the light exit surface 39.

(Directional Conversion Pattern According to First Embodiment)

Figure 7:
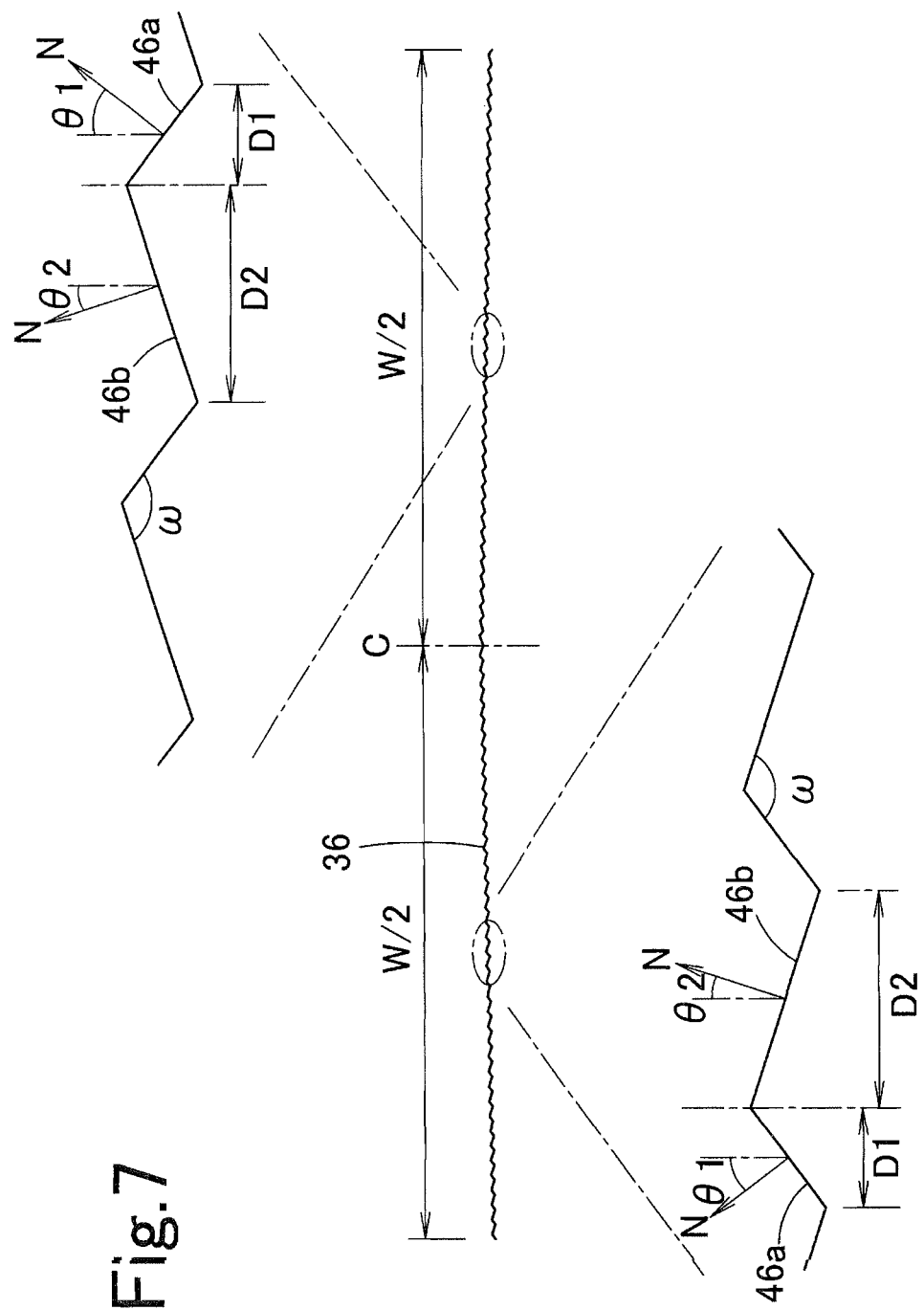
FIG. 7 is a sectional view along an X-X line of FIG. 5, also depicting a portion thereof partially enlarged.

FIG. 7 depicts a section of the directional conversion pattern 36 of the first embodiment on an X-X line of FIG. 5. That is, FIG. 7 depicts a portion of a section of the directional conversion pattern 36 obtained by cutting in parallel to the light incidence surface 38, the portion being positioned in front of the point source of light 32 and in a region having a width (a light source width W) equal to the width of the point source of light 32 (that is, regions from a light source center C by W/2 toward both of left and right sides). Here, the light source center C is a plane passing through a center of light emission 32*a* of the point source of light 32 and perpendicular to the light incidence surface 38 and the light exit surface 39 of the light guide plate 33. Also, the light source width W does not refer to the width of a package of the point source of light 32 but refers to the width of the light emission surface (light exit window 44). The directional conversion pattern 36 has a shape laterally symmetrical with respect to the light source center C in FIG. 7, but is not necessarily required to be laterally symmetrical.

In the surface light source device according to the first embodiment of the present invention, the directional conversion pattern 36 has a structure or characteristic as will be described below in the region of the light source width W in the section parallel to the light incidence surface 38. A region outside the light source width W may also have a structure or characteristic similar to the region of the light source width W. However, since light quantity and light intensity to be supplied are small in a region away from the point source of light 32, the structure of the directional conversion pattern 36 is not particularly restrictive outside the light source width W.

In the region of the light source width W on the section parallel to the light incidence surface 38, most or all of the pattern elements included in the directional conversion pattern 36 each have an asymmetrical shape. That is, a pattern inclined surface 46*a* connecting a ridge line (a maximum point of the section) and one valley line (a minimum point of the section) adjacent to the ridge line and a pattern inclined surface 46*b* connecting the ridge line and the other valley line adjacent to the ridge line are laterally asymmetrical with respect to a straight line passing through the ridge line and perpendicular to the light exit surface 39. However, part of the pattern elements (for example, a pattern element at the position of the light source center C) may be laterally symmetrical. Here, the pattern inclined surfaces 46*a* and 46*b* form a front surface of the directional conversion pattern 36 positioned between adjacent ridge line and valley line. While the pattern inclined surfaces 46*a* and 46*b* are flat surfaces in the directional conversion pattern 36 depicted in FIG. 7, they may be curved surfaces or bent surfaces as described below.

Also, in a region of the light source center C and by W/2 from there toward a left side (hereinafter referred to as a left region from the light source center C), when a normal N is set on each of the pattern inclined surfaces 46*a* and 46*b* from the inside toward the outside of the light guide plate 33, a total sum of breadths D2 of the pattern inclined surfaces 46*b* each with the normal N inclined to a light source center side (a total value of the breadths D2 of the respective pattern inclined surfaces 46*b* in the left region with the width W/2) is larger than a total sum of breadths D1 of the pattern inclined surfaces 46*a* each with the normal N inclined to a side opposite to the light source center (a total value of the breadths D1 of the respective pattern inclined surfaces 46*a* in the left region with the width W/2) (Condition 1: ΣD1<ΣD2).

Similarly, in a region of the light source center C and by W/2 from there toward a right side (hereinafter referred to as a right region from the light source center C), when the normal N is set on each of the pattern inclined surfaces 46*a* and 46*b* from the inside toward the outside of the light guide plate 33, a total sum of breadths D2 of the pattern inclined surfaces 46*b* each with the normal N inclined to the light source center side (a total value of the breadths D2 of the respective pattern inclined surfaces 46*b* in the right region with the width W/2) is larger than a total sum of breadths D1 of the pattern inclined surfaces 46*a* each with the normal N inclined to the side opposite to the light source center (a total value of the breadths D1 of the respective pattern inclined surfaces 46*a* in the right region with the width W/2) (Condition 1: ΣD1<ΣD2).

To achieve this mode, in adjacent two pattern inclined surfaces 46*a* and 46*b* (pattern elements), it is sufficient that the breadth D2 of the pattern inclined surface 46*b* with the normal N inclined to the light source center side is larger than or equal in part to the breadth D1 of the pattern inclined surface 46*a* with the normal N inclined to the side opposite to the light source center (Condition 2: D1≤D2). It is sufficient that at least part of the pattern elements in the region of the light source width W satisfies this Condition 2. While pattern elements satisfying this Condition 2 according to one or more embodiment of the present invention are as many as possible, this is not necessarily required for all pattern elements.

Figure 3:
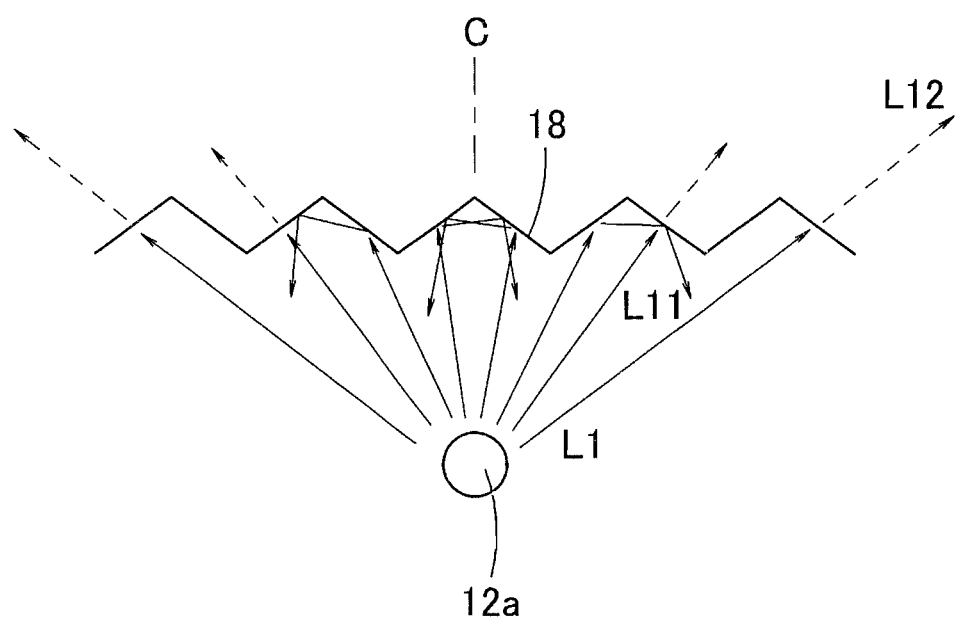
FIG. 3 is a schematic view for describing the state in which light leaks from a directional conversion pattern.
Figure 8:
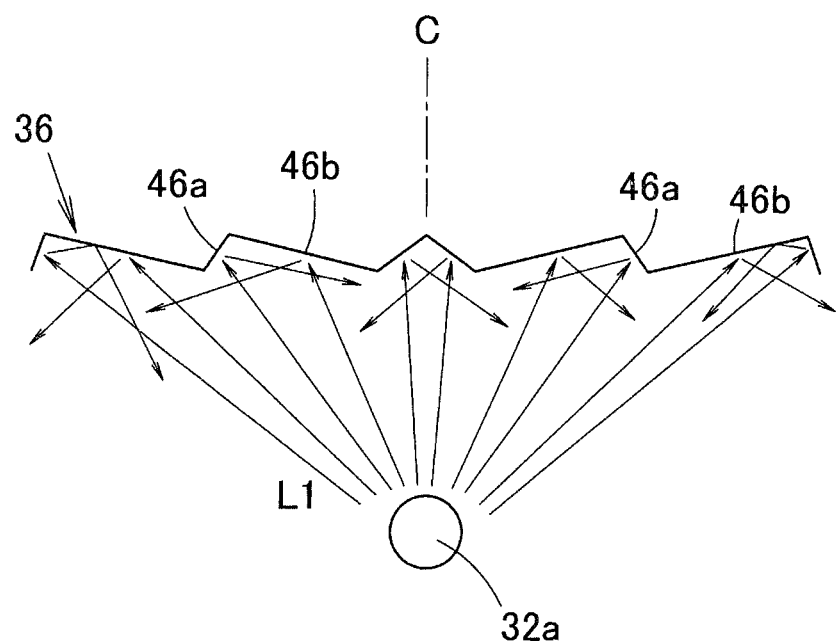
FIG. 8 is a diagram for describing the operation of a directional conversion pattern depicted in FIG. 7.

In the surface light source device 31 of the first embodiment, in each of the left and right regions of the light source center C, the total sum of the breadths D2 of the pattern inclined surfaces 46*b* each with the normal N inclined to the light source center side is larger than the total sum of the breadths D1 of the pattern inclined surfaces 46*a* each with the normal N inclined to the side opposite to the light source center (Condition 1). In particular, in many pattern elements, the breadth D2 of the pattern inclined surface 46*b* with the normal N inclined to the light source center side is larger than or equal in part of the pattern elements to the breadth D1 of the pattern inclined surface 46*a* with the normal N inclined to the side opposite to the light source center (Condition 2). As a result, as depicted in FIG. 8, the area of the pattern inclined surface 46*a* which light L1 emitted from the center of light emission 32*a* in a slanting direction enters at an angle in a nearly perpendicular manner is narrow compared with the directional conversion pattern with laterally-symmetrical pattern elements (refer to FIG. 3), thereby making light less prone to leaking from the pattern inclined surface 46*a*. Furthermore, since the tilt angle of the pattern inclined surface 46*a* with the normal N inclined to the side opposite to the light source center C is large, an angle of incidence of the light L1 entering the pattern inclined surface 46*a* is large compared with the case in which the pattern elements of the directional conversion pattern are laterally symmetrical, thereby making the light L1 less prone to leaking from the pattern inclined surface 46*a*. As a result, according to the surface light source device 31 of the first embodiment, light leakage from the directional conversion pattern 36 can be suppressed, thereby improving light use efficiency.

(in the Case of Curved or Bent Pattern Inclined Surfaces)

The pattern inclined surfaces 46*a* and 46*b* of the directional conversion pattern 36 are not necessarily required to be flat surfaces, and may be curved surfaces or bent surfaces. FIG. 9A to FIG. 9D each depict a section of the directional conversion pattern 36 with the pattern inclined surfaces 46*a* and 46*b* formed of curved surfaces. In the directional conversion pattern 36 depicted in FIG. 9A, both of the pattern inclined surfaces 46a and 46b are curved so as to swell outward. In the directional conversion pattern 36 depicted in FIG. 9B, both of the pattern inclined surfaces 46a and 46b are curved so as to be recessed inward. In the directional conversion pattern 36 depicted in FIG. 9C, one of the pattern inclined surfaces 46a and 46b swells outward, and the other is recessed inward. Also, in the directional conversion pattern 36 depicted in FIG. 9D, the pattern inclined surfaces 46a and 46b are curved smoothly as a whole.

Figure 10A:
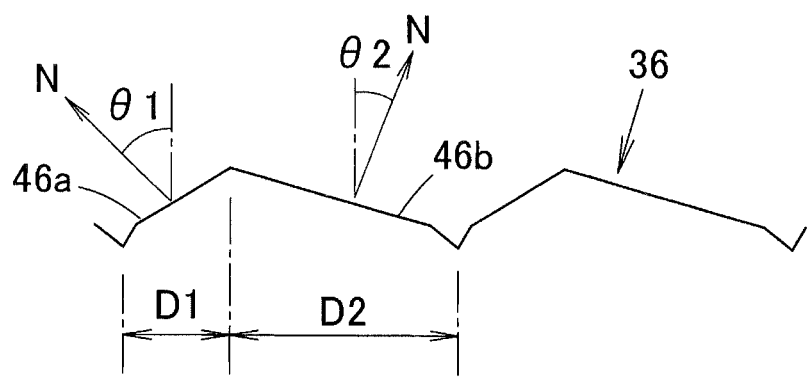
FIG. 10A and FIG. 10B are schematic views of modification examples of the directional conversion pattern depicted in FIG. 7.
Figure 10B:
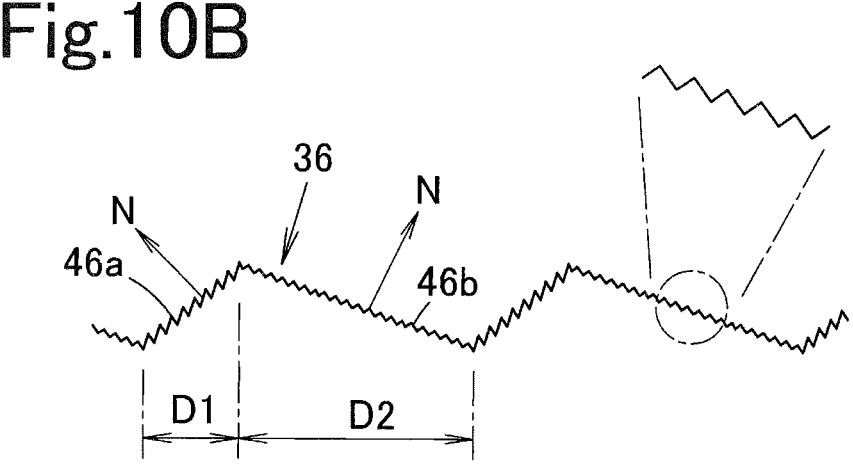

FIG. 10A and FIG. 10B each depict a section of the directional conversion pattern 36 with the pattern inclined surfaces 46a and 46b formed of bent surfaces. In the directional conversion pattern 36 depicted in FIG. 10A, the pattern inclined surfaces 46a and 46b are bent as a whole in a polygonal shape. In the directional conversion pattern 36 depicted in FIG. 10B, while the pattern inclined surfaces 46a and 46b are flat surfaces as a whole, they are bent like a saw blade when viewed minutely.

Figure 11:
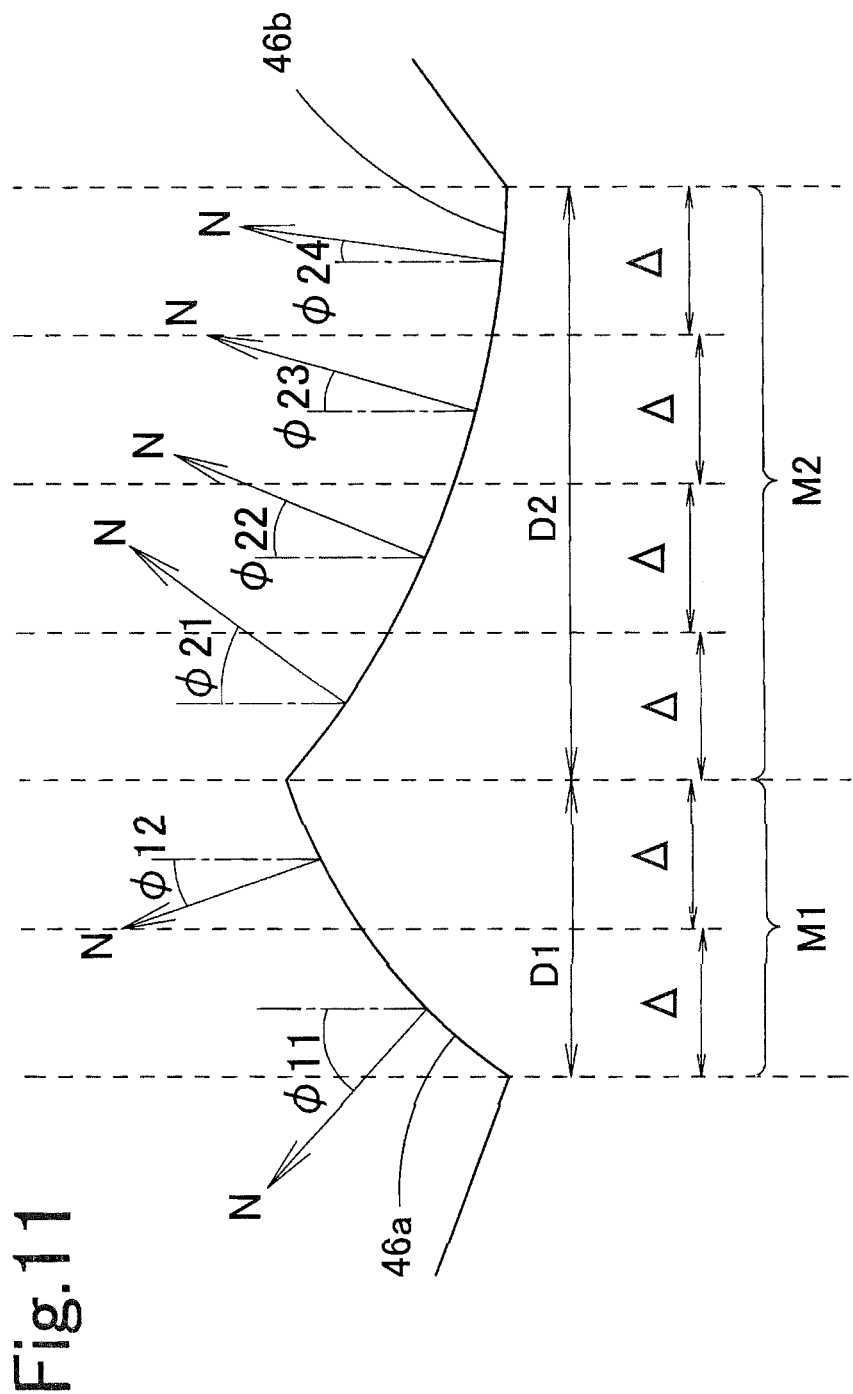
FIG. 11 is a diagram for describing how to find a breadth and a normal angle of a curved or bent pattern inclined surface

As such, even when the pattern inclined surfaces 46a and 46b are configured of curved surfaces or bent surfaces, as depicted in FIG. 11, if horizontal distances of sections each between a ridge line and a valley line are represented by the breadths D1 and D2 of the pattern inclined surfaces 46a and 46b, Condition 1 and Condition 2 described above can be applied.

(when Pattern Elements are Varied According to Distance from Light Source Center)

Figure 12:
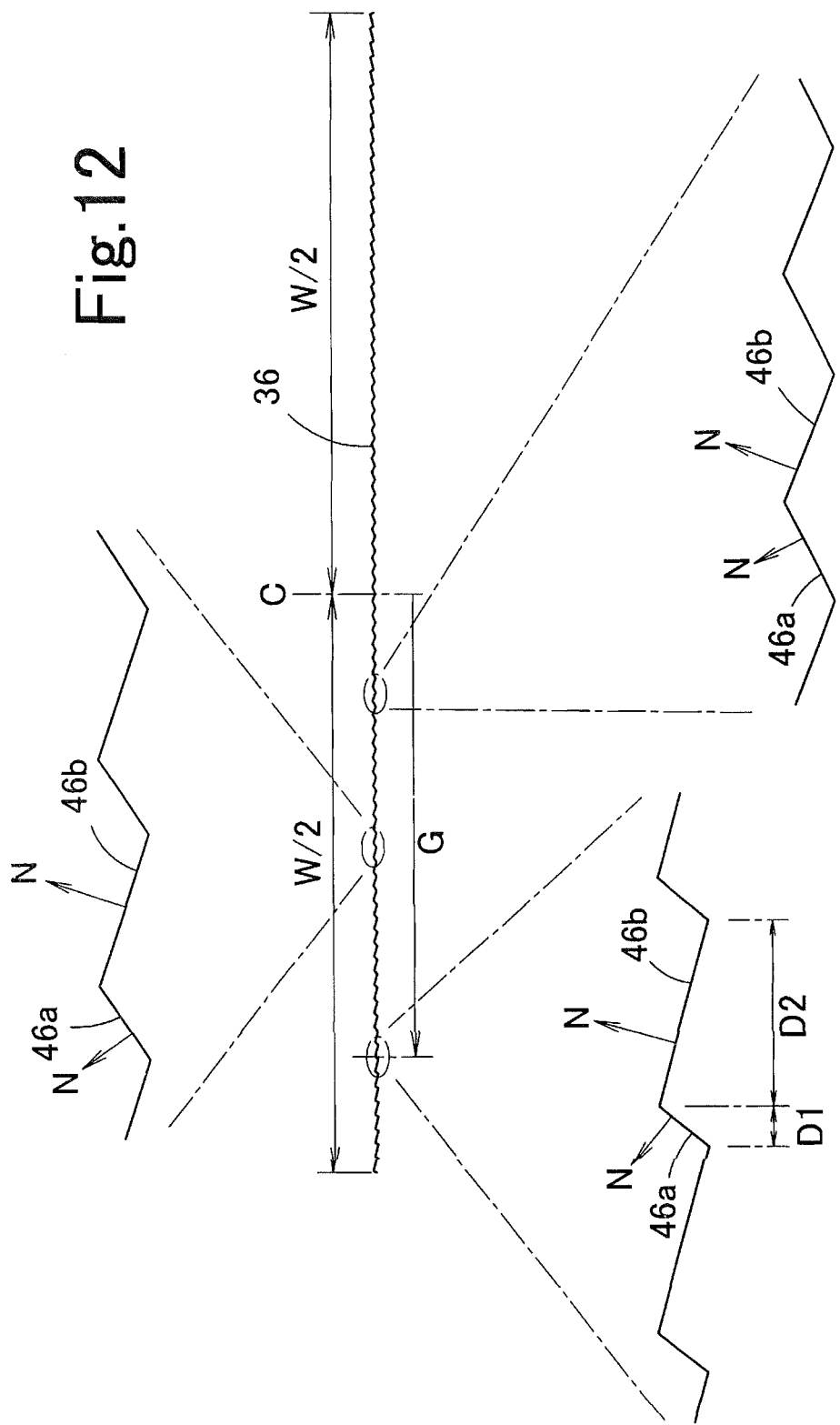
FIG. 12 is a sectional view of the directional conversion pattern in which the sectional shapes of pattern elements are varied according to the distance from the light source center, also depicting a portion thereof partially enlarged.

In the directional conversion pattern 36 depicted in FIG. 7, pattern elements of the same sectional shape are repeatedly arranged in the left region and the right region of the light source center C. However, the sectional shape of each pattern element may be varied according to the distance from the light source center C. FIG. 12 depicts the directional conversion pattern 36 in which the sectional shapes of pattern elements are varied according to a distance G from the light source center C. In particular, in the directional conversion pattern 36 depicted in FIG. 12, a ratio of the breadth D1 of the pattern inclined surface 46a with the normal N inclined to the side opposite to the light source center C with respect to a sum of the breadths of adjacent pattern inclined surfaces 46a and 46b, (D1+D2), that is, D1/(D1+D2), decreases as the distance G from the light source center C increases, or the ratio is equal in part of the pattern elements.

Figure 13:
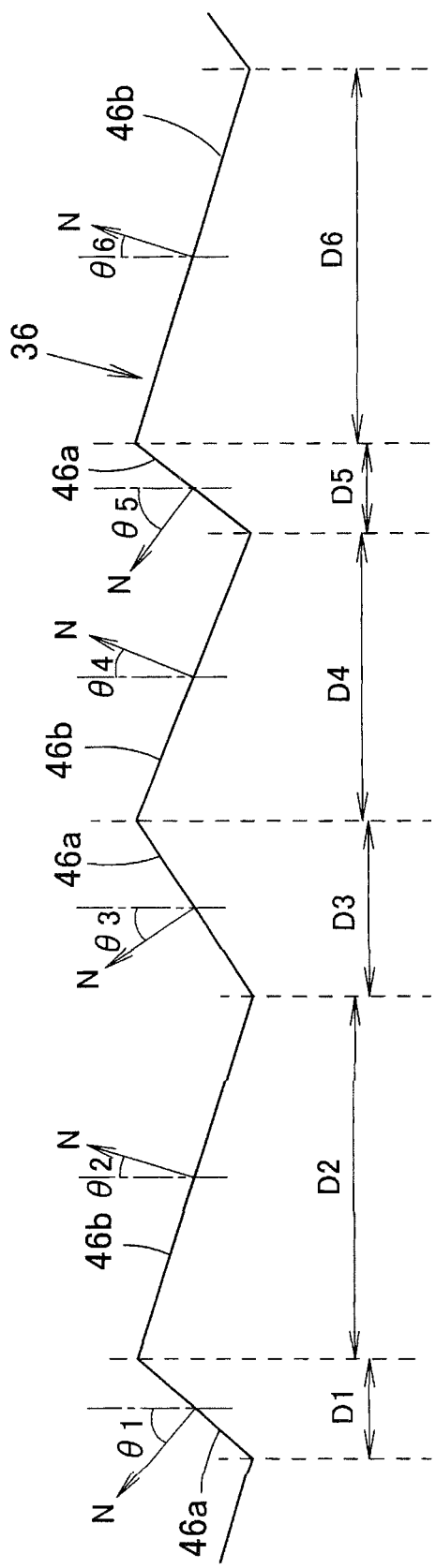
FIG. 13 is a diagram for describing how to find an average angle with respect to normals set at pattern inclined surfaces.

As such, even if the sectional shape of each pattern element is gradually varied, as depicted in FIG. 13, if the breadths of the pattern inclined surfaces 46a and 46b are sequentially set at D1, D2, D3, D4, . . . , it is sufficient to satisfy Condition 1 regarding the total sum of the breadths of the pattern inclined surfaces in the left region and the right region, that is, $$D1+D3+D5+\ldots < D2+D4+D6+\ldots$$

For this, it is sufficient that most of the pattern elements satisfy Condition 2 described above in each of the left region and the right region, that is, $$D1 \leq D2, D3 \leq D4, D5 \leq D6, \ldots$$

When the sectional shape of each pattern element is varied according to the distance G from the light source center C in the manner described above, as depicted in FIG. 14, it is desirable to vary the shape so that the ratio D1/(D1+D2) decreases as the distance G from the light source center C increases or the ratio is equal in part of the pattern elements, while a vertical angle co between adjacent pattern inclined surfaces 46a and 46b is kept constant.

Figure 15:
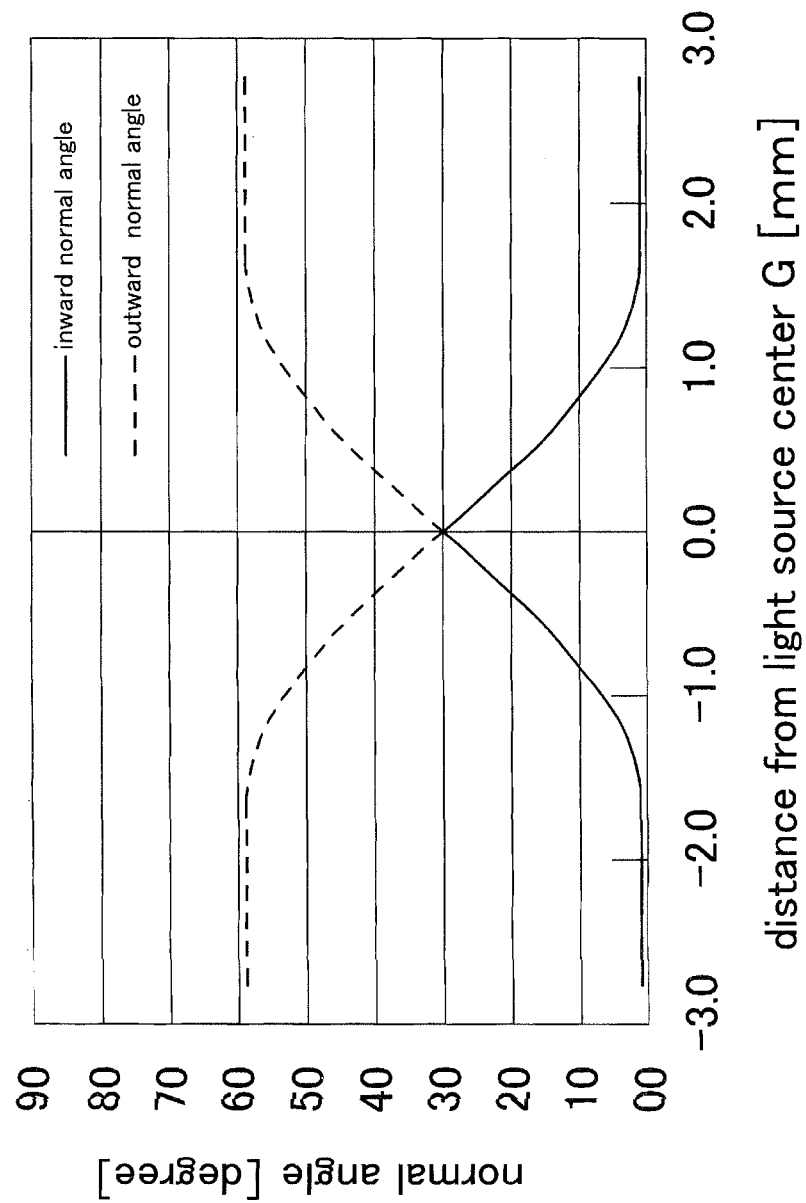
FIG. 15 is a diagram of an outward normal angle and an inward normal angle of pattern elements whose sectional shapes are varied according to the distance from the light source center while a vertical angle is kept constant, also depicting a portion thereof partially enlarged.

The inventors of the present invention performed a simulation to evaluate light guide efficiency for a directional conversion pattern of a comparative example in which pattern elements having the same sectional shape are repeatedly arranged and the directional conversion pattern of the first embodiment in which the sectional shape is gradually varied while the vertical angle is kept constant. A surface light source device model was used, with the light source width W of the point source of light being 2 mm, the width of the light guide plate being 5.5 mm, the thickness t of the light guide plate main body 34 being 0.23 mm, a height T of the light introducing part 35 being 0.42 mm, the length of the light introducing part 35 being 1.5 mm, and the refractive index of the light guide plate being 1.59. Also, in the directional conversion pattern of the comparative example, pattern elements each having a laterally symmetrical sectional shape with the vertical angle co being 120° are repeated arranged. The directional conversion pattern of the first embodiment has a laterally-symmetrical pattern element with a vertical angle of 120° at the position of the light source center C, but the shape of each pattern element is varied as the pattern elements are away from the light source center C as depicted in FIG. 15 while the vertical angle is kept at 120°. The horizontal axis of FIG. 15 represents the distance G of each pattern element measured from the light source center C. The vertical axis of FIG. 15 represents angles of the pattern element positioned at the distance G, one angle formed by the normal N of the pattern inclined surface 46a inclined to the side opposite to the light source center C and a direction perpendicular to the light exit surface 39 (an outward normal angle) and the other angle formed by the normal N of the pattern inclined surface 46b inclined to the light source center side and a direction perpendicular to the light exit surface 39 (an inward normal angle). As can be seen from FIG. 15, in the directional conversion pattern of the first embodiment, the vertical angle co is kept at a constant angle (120°) from one side end to the other side end of the light guide plate, the sectional shape of each pattern element is varied in a region slightly wider than the light source width W, and the sectional shape outside the region is constant.

According to the simulation described above, while the light guide efficiency was 91% in the comparative example, the light guide efficiency was 96% in the first embodiment. The light guide efficiency indicates the ratio of a light amount entering from the light introducing part to the light guide plate main body with regard to a light amount entering from the light incident face to the light introducing part. Thus, it can be found that while 9% of light leaks from the light introducing part as a loss in the comparative example with a constant sectional shape of each pattern element, light leakage from the light introducing part is decreased to 4% in the first embodiment with the sectional shape of each pattern element being varied while the vertical angle being kept constant.

Figure 14:
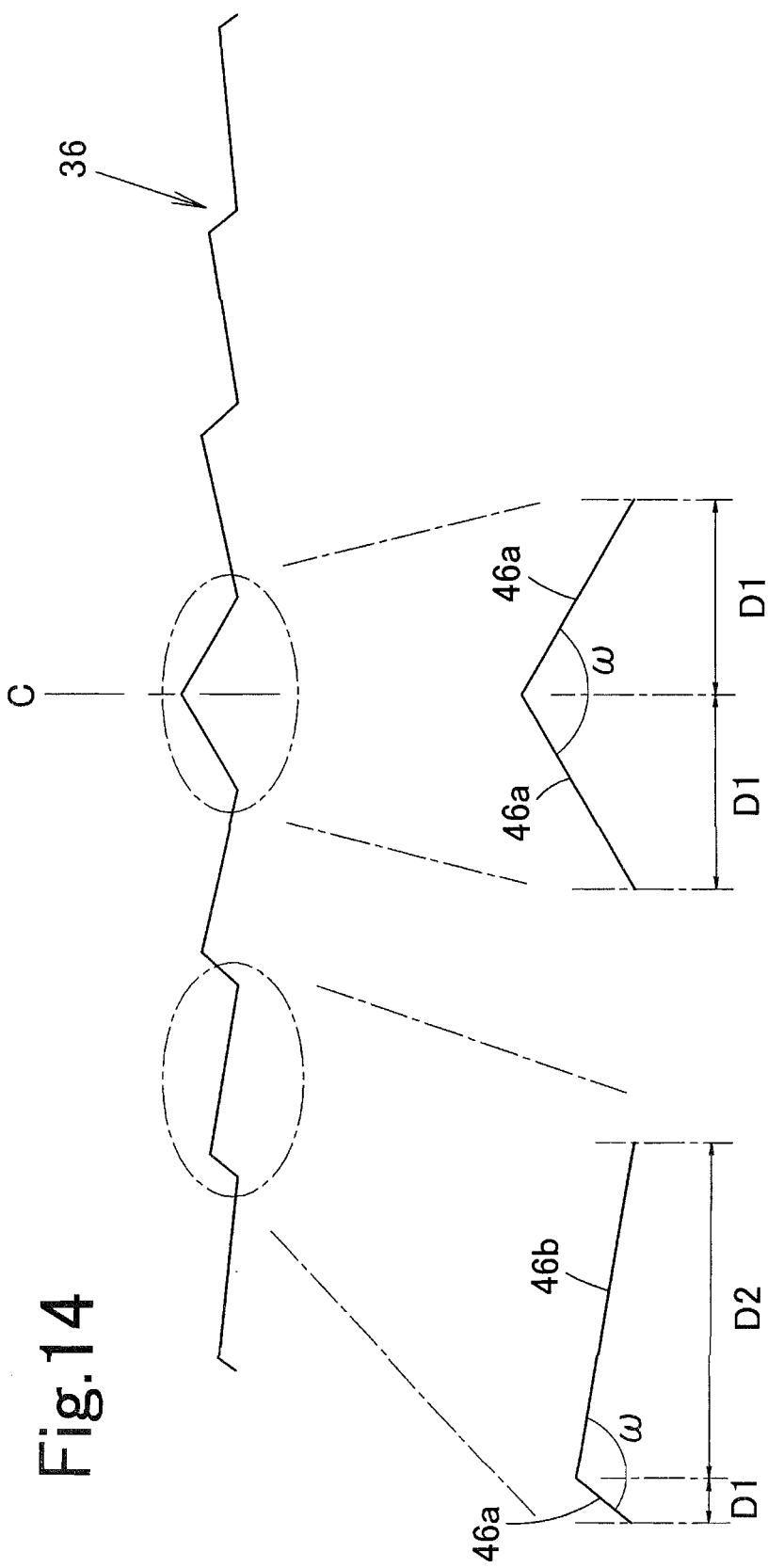
FIG. 14 is a sectional view of a directional conversion pattern in which the sectional shapes of pattern elements are varied according to the distance from the light source center while a vertical angle is kept constant, also depicting a portion thereof partially enlarged.

Also, the constant vertical angle co of each pattern element as in the directional conversion pattern 36 of FIG. 14 eases the manufacture of a metal mold for molding. That is, when a metal mold for molding a light guide plate is fabricated, a V-grooved pattern of a metal mold is formed for a mount-shaped pattern element. If the vertical angle co of each pattern element is constant, when a metal mold is cut into V-grooved patterns in sequence by cutting with a tool, cutting it into the V grooves in sequence can be performed with the tilt of one tool for V grooves being changed, thereby easing the manufacture of a metal mold.

Figure 16A:
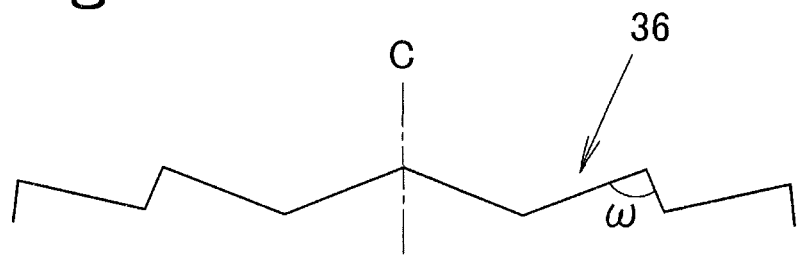
FIG. 16A and FIG. 16C are schematic sectional views of various directional conversion patterns whose sectional shapes are varied according to the distance from the light source center.
Figure 16B:
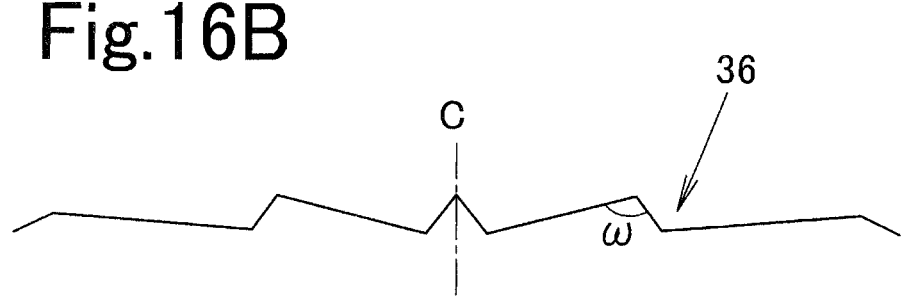
Figure 16C:
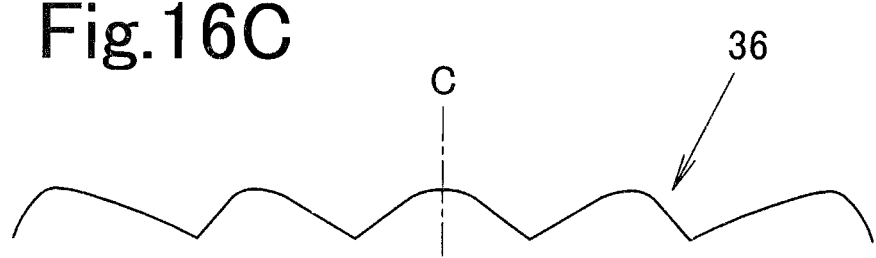

There are various modes to vary the sectional shape of each pattern element according to the distance G from the light source center C. For example, in the directional conversion pattern 36 depicted in FIG. 16A, the vertical angle co of each pattern element is gradually decreased as the pattern element are away from the light source center C. In the directional conversion pattern 36 depicted in FIG. 16B, the vertical angle co of each pattern element is gradually increased as the pattern element are away from the light source center C. FIG. 16C depicts the directional conversion pattern 36 in which pattern elements each having a curved surface are arrange, and the degree of curvature of each pattern element is gradually varied as the pattern elements are away from the light source center C.

While various shapes are possible as described above as the shape of the directional conversion pattern 36 in the first embodiment, as a result of tests and studies by the inventors of the present invention, it has been found that light guide efficiency higher than those of conventional products can be obtained if the following Condition 3 is satisfied, irrespectively of the shape of the directional conversion pattern 36. That is, when a value represented by $$\alpha = D1/(D1+D2) + 0.912 \times (G/W) \quad \text{(Equation 1)}$$

is considered, light guide efficiency higher than those of conventional products can be obtained if the value of a is equal to or larger than 0.3 and equal to or smaller than 0.9. Here, D1 and D2 are breadths of adjacent pattern inclined surfaces 46a and 46b, respectively. G is a distance from the light source center C to each of the pattern inclined surfaces 46a and 46b. W is a light source width.

Figure 17:
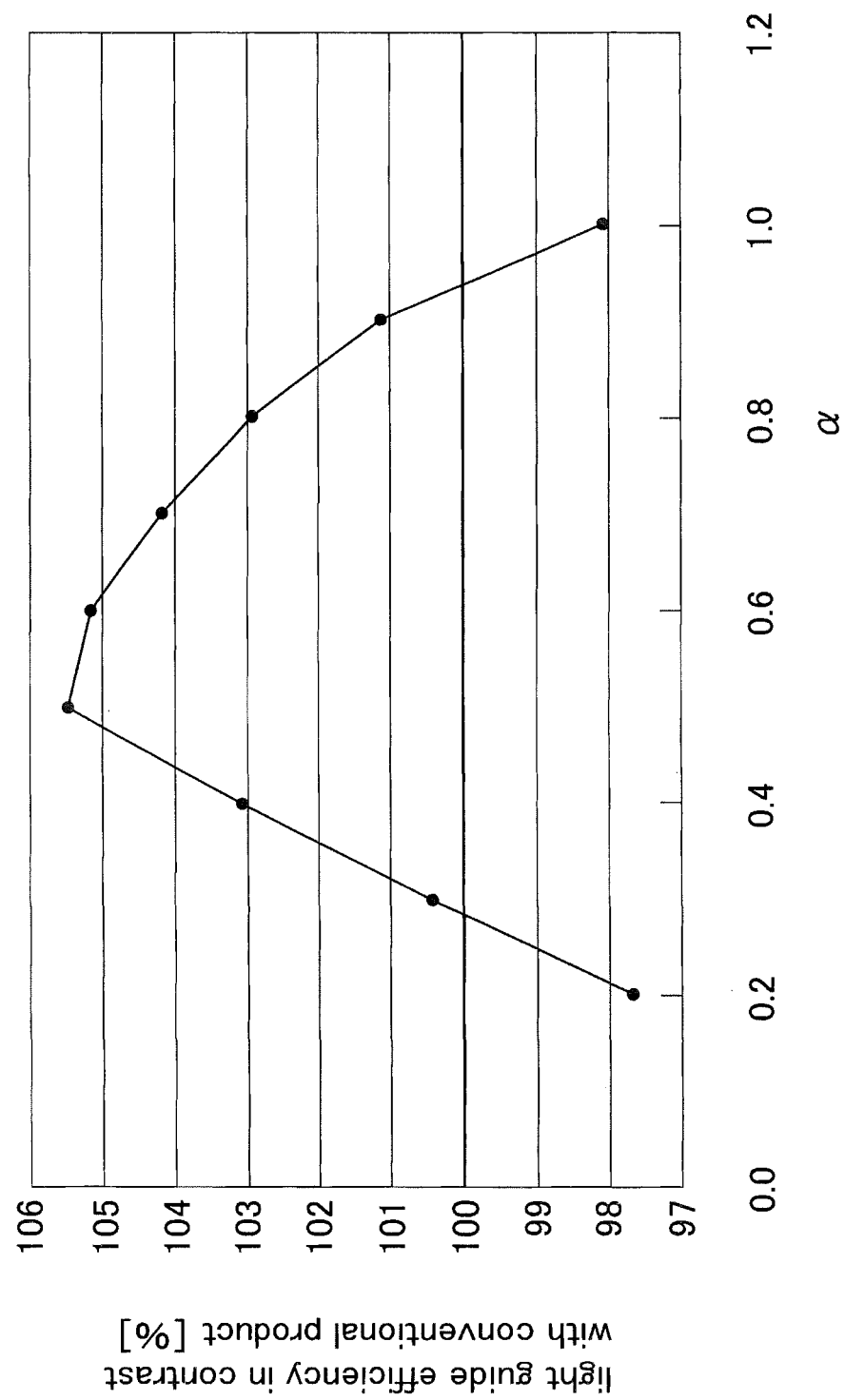
FIG. 17 is a diagram depicting a relation between a value α defined by Equation 1 and light guide efficiency with light guide efficiency of a conventional product being taken as 100%.

FIG. 17 is a diagram depicting a relation between the value α described above and light guide efficiency. The vertical axis of FIG. 17 is represented with the light guide efficiency of the light guide plate in contrast with conventional products (in which the same pattern elements that are laterally symmetrical are arranged) being taken as 100%. According to FIG. 17, it can be found that the light guide efficiency is the highest with α being approximately 0.5 and the light guide efficiency is improved more than those of conventional products when α is equal to or larger than 0.3 and equal to or smaller than 0.9.

Thus, when a ratio of the breadths D1 of the pattern inclined surfaces 46a with respect to a sum of the breadths of adjacent pattern inclined surfaces 46a and 46b, (D1+D2), with the normal oriented to a side opposite to the light source center C is A=D1/(D1+D2) and a ratio of the distance G from the light source center C to the two pattern inclined surfaces with respect to ½ of the open width W of the light source is B=G/(W/2), Equation 1 described above can be represented as $$A = -0.456 \times B + \alpha \quad \text{(Equation 2), and}$$

light guide efficiency is improved more than those of conventional products if a is in a range of $$0.3 \leq \alpha \leq 0.9 \quad \text{(Condition 3)}.$$

However, while Condition 3 is not a condition required for all pattern elements, pattern elements satisfying Condition 3 according to one or more embodiments of the present invention is as many as possible.

Figure 18:
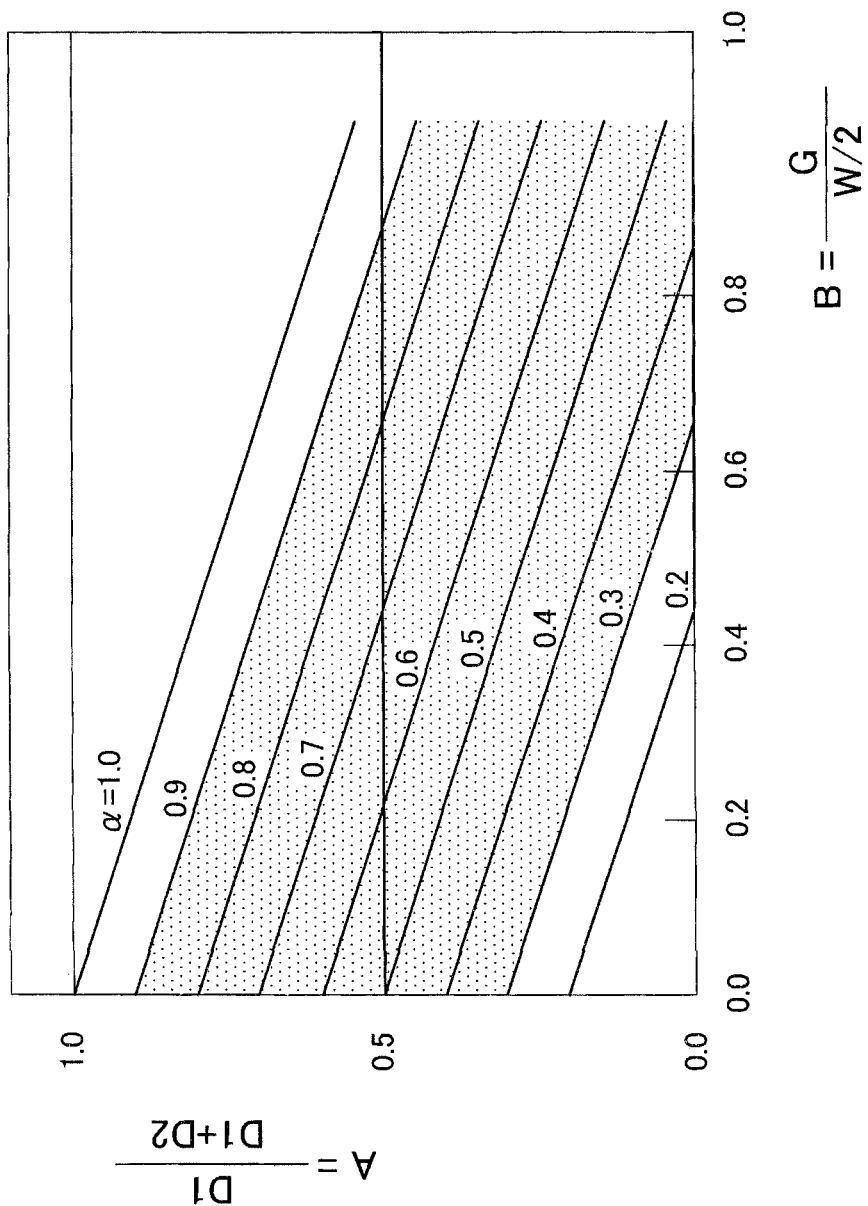
FIG. 18 is a diagram of a region with high light guide efficiency.

FIG. 18 is a diagram with the horizontal axis being set as B=G/(W/2) and the vertical axis being set as A=D1/(D1+D2), having straight lines drawn with a value of a being 0.2 to 1.0. If a value is in a hatched region in this drawing, the light guide efficiency of the surface light source device is improved more than those of conventional products.

(Directional Conversion Pattern According to Second Embodiment)

Next, a surface light source device according to a second embodiment is described. The surface light source device of the second embodiment also has a basic structure similar to that as depicted in FIG. 4 to FIG. 6, and has the same structure as that of the surface light source device 31 of the first embodiment except a directional conversion pattern, and therefore description of the basic structure of the surface light source device in the second embodiment is omitted. Also, for the directional conversion pattern 36, its basic sectional shape is common to that of the first embodiment, and therefore the structure of the directional conversion pattern 36 according to the second embodiment is described by using FIG. 7 to FIG. 16.

In the surface light source device according to the second embodiment of the present invention, the directional conversion pattern 36 has a structure or characteristic as will be described below in the region of the light source width W in a section in parallel to the light incidence surface 38. While a structure or characteristic similar to that in the region of the light source width W may be provided also in a region outside the light source width W, since the light amount to be supplied and the light intensity are small in a region away from the point source of light 32, the structure of the directional conversion pattern 36 is not particularly restricted outside the light source width W.

In the region of the light source width W in the section in parallel to the light incidence surface 38, most or all of the pattern elements included in the directional conversion pattern 36 each have an asymmetrical sectional shape. Also, the directional conversion pattern 36 of the second embodiment is characterized by the angle of the normal N set on each of the pattern inclined surfaces 46a and 46b or an average angle thereof. That is, in the section in parallel to the light incidence surface 38, in a region of the light source center C and by W/2 from there toward a left side (a left region), an average angle θm2 of angles θ2 (hereinafter, inward normal angles) each formed by the normal N inclined to the light source center side (hereinafter, an inward normal) and a direction perpendicular to the light exit surface 39 is smaller than an average angle θm1 of angles θ1 (hereinafter, outward normal angles) each formed by the normal N inclined to the side opposite to the light source center (hereinafter, an outward normal) and a direction perpendicular to the light exit surface 39 (Condition 4: θm1>θm2). Here, regarding average inclination angles, the average angle θm1 of the outward normal and the average angle θm2 of the inward normal is represented by the following Equations 3 and 4 when outward normal angles of the respective pattern inclined surfaces 46a are θ1, θ3, θ5, . . . , inward normal angles of the respective pattern inclined surfaces 46b are θ2, θ4, θ6 . . . , the breadths of the respective pattern inclined surfaces 46a and 46b with the normal angle being θ1, θ2, θ3, θ4, . . . are D1, D2, D3, D4, . . . in a left region or a right region as depicted in FIG. 13.

[Equation 1]

$$\theta m1 = \frac{\theta 1 \times D1 + \theta 3 \times D3 + \theta 5 \times D5 + \ldots}{D1 + D3 + D5 + \ldots} \quad \text{(Equation 3)}$$

$$\theta m2 = \frac{\theta 2 \times D2 + \theta 4 \times D4 + \theta 6 \times D6 + \ldots}{D2 + D4 + D6 + \ldots} \quad \text{(Equation 4)}$$

Similarly, also in a region of the light source center C and by W/2 from there toward a right side (a right region) in a section in parallel to the light incidence surface 38, the average angle θm2 of inward normal angles θ2 each formed by the inward normal N and a direction perpendicular to the light exit surface 39 is smaller than the average angle θml of outward normal angles θ1 each formed by the outward normal normal N and a direction perpendicular to the light exit surface 39 (Condition 4: θm1>θm2).

To achieve this mode, in adjacent two pattern inclined surfaces 46a and 46b (pattern elements), it is sufficient that the outward normal angle θ1 of the pattern inclined surface 46a is larger than or equal in part of the pattern elements to the inward angle θ2 of the pattern inclined surface 46b (Condition 5: θ1≥θ2). It is sufficient that at least part of the pattern elements in the region of the light source width W satisfies this Condition 5. While pattern elements satisfying this Condition 5 according to one or more embodiments of the present invention are as many as possible, this is not necessarily required for all pattern elements.

FIG. 7 represents the directional conversion pattern 36 in which pattern elements having the same shape are repeatedly arranged. In this case, the outward normal angles θ1 of the normal N set on each pattern inclined surface 46a are equal to each other among the pattern elements and, furthermore, their average angle θm1 is equal to θ1. Similarly, the inward normal angles θ2 of the normal N set on each pattern inclined surface 46b are equal to each other among the pattern elements and, furthermore, their average angle θm2 is equal to θ2.

In the surface light source device of the second embodiment, in each of the left and right regions of the light source center C, the average angle θm2 of the inward normal N is smaller than the average angle θm1 of the outward normal N. In particular, in many pattern elements, the outward normal angle θ1 of the pattern inclined surface 46a is larger than or equal in part of the pattern elements to the inward normal angle θ2 of the pattern inclined surface 46b. Thus, as depicted in FIG. 8, compared with a directional conversion pattern with laterally-symmetrical pattern elements, the angle of incidence of the light L1 entering the pattern inclined surface 46a is large, and the light L1 is less prone to leaking from the pattern inclined surface 46a. Furthermore, as depicted in FIG. 8, the area of the pattern inclined surface 46a having the outward normal is smaller than or equal to the area of the pattern inclined surface 46b having the inward normal. Therefore, the area of the pattern inclined surface 46a which the light L1 emitting from the center of light emission 32a in a slanting direction enters at an angle in a nearly perpendicular manner is narrow compared with the directional conversion pattern with laterally-symmetrical pattern elements (refer to FIG. 3), thereby making light less prone to leaking from the pattern inclined surface 46a. As a result, according to the surface light source device 31 of the second embodiment, light leakage can be suppressed, thereby improving light use efficiency.

(in the Case of Curved or Bent Pattern Inclined Surfaces)

Also in the second embodiment, the pattern inclined surfaces 46a and 46b are not necessarily required to be flat surfaces, and may be curved surfaces or bent surfaces. FIG. 9A to FIG. 9D each depict a section of the directional conversion pattern 36 with the pattern inclined surfaces 46a and 46b formed of curved surfaces. In the directional conversion pattern 36 depicted in FIG. 9A, both of the pattern inclined surfaces 46a and 46b are curved so as to swell outward. In the directional conversion pattern 36 depicted in FIG. 9B, both of the pattern inclined surfaces 46a and 46b are curved so as to be recessed inward. In the directional conversion pattern 36 depicted in FIG. 9C, one of the pattern inclined surfaces 46a and 46b swells outward, and the other is recessed inward. Also, in the directional conversion pattern 36 depicted in FIG. 9D, the pattern inclined surfaces 46a and 46b are curved smoothly as a whole.

FIG. 10A and FIG. 10B each depict a section of the directional conversion pattern 36 with the pattern inclined surfaces 46a and 46b formed of bent surfaces. In the directional conversion pattern 36 depicted in FIG. 10A, the pattern inclined surfaces 46a and 46b are polygonally bent. In the directional conversion pattern 36 depicted in FIG. 10B, while the pattern inclined surfaces 46a and 46b are flat surfaces as a whole, they are bent like a saw blade when viewed minutely.

As such, when the pattern inclined surfaces 46a and 46b are configured of curved surfaces or bent surfaces, the angles θ1 and θ2 of the normal N set on the pattern inclined surfaces 46a and 46b cannot be determined on an as-is basis. Therefore, in this case, the angles (normal angles) θ1 and θ2 of the normal N set on the pattern inclined surfaces 46a and 46b are determined as follows. As depicted in FIG. 11, the pattern inclined surface 46a is divided into M1 with a uniform breadth A, and the normal N is set on each individual inclined surface obtained by division into M1, and angles ϕ11, ϕ12, ... each formed by the normal N and a direction perpendicular to the light emission surface 39 are found. Upon determination of the angles ϕ11, ϕ12, ..., the normal angle θ1 of the pattern inclined surface 46a can be found by the following Equation 5.

Similarly, the pattern inclined surface 46b is divided into M2 with a uniform breadth A, and the normal N is set on each individual inclined surface obtained by division into M2, and angles ϕ21, ϕ22, ... each formed by the normal N and a direction perpendicular to the light emission surface 39 are found. Upon determination of the angles ϕ21, ϕ22, ..., the normal angle θ2 of the pattern inclined surface 46b can be found by the following Equation 6.

[Equation 2]

$$\theta 1 = \frac{\phi 11 \times \Delta + \phi 12 \times \Delta + \ldots}{M1 \times \Delta} \quad \text{(Equation 5)}$$

$$\theta 2 = \frac{\phi 21 \times \Delta + \phi 22 \times \Delta + \ldots}{M2 \times \Delta} \quad \text{(Equation 6)}$$

(when Pattern Element is Varied According to Distance from Light Source Center)

Also in the directional conversion pattern 36 of the second embodiment, the sectional shape of each pattern element may be varied according to the distance from the light source center C. FIG. 12 depicts the directional conversion pattern 36 with the sectional shape of each pattern element being varied according to the distance G from the light source center C. In particular, in the directional conversion pattern 36 depicted in FIG. 12, the inward normal angle is gradually decreased as the distance G from the light source center C is increased, or is the same in part of the pattern elements. Alternatively, the outward normal angle is gradually increased as the distance G from the light source center C is increased, or is the same in part of the pattern elements.

Even if the sectional shape of each pattern element is gradually varied as described above, it is sufficient that the average angle θm2 of the inward normal is smaller than the average angle θm1 of the outward normal N in each of the left and right regions of the light source center C. For this, it is sufficient that the outward normal angle θ1 is larger than or equal in part of the pattern elements to the inward normal angle θ2 in most of the pattern elements.

In the first embodiment, a difference in light guide efficiency has been described between the comparative example in which the sectional shape of each pattern element is globally the same and the case in which the inward normal angle and the outward normal angle are varied as depicted in FIG. 14 and FIG. 15 with the vertical angle ω being kept constant. This can be construed similarly in the second embodiment, and therefore is now repeatedly described.

As described above, a model of the surface light source device was used in a simulation of a comparative example and the second embodiment, with the light source width W of the point source of light being 2 mm, the width of the light guide plate being 5.5 mm, the thickness t of the light guide plate main body 34 being 0.23 mm, the height T of the light introducing part 35 being 0.42 mm, the length of the light introducing part 35 being 1.5 mm, and the refractive index of the light guide plate being 1.59. Also, in the directional conversion pattern of the comparative example, pattern elements each having a laterally symmetrical sectional shape with the vertical angle ω being 120° are repeated arranged. The directional conversion pattern of the second embodiment has a laterally-symmetrical pattern element with a vertical angle of 120° at the position of the light source center C, but outward normal angles and inward normal angles are varied as the pattern elements are away from the light source center C as depicted in FIG. 15 while the vertical angle is kept at 120°. The horizontal axis of FIG. 15 represents the distance G of each pattern element measured from the light source center C. The vertical axis of FIG. 15 represents an outward normal angle and an inward normal angle of the pattern element positioned at the distance G. As can be seen from FIG. 15, in the directional conversion pattern of the second embodiment, the vertical angle co is kept at a constant angle (120°) from one side end to the other side end of the light guide plate, the sectional shape of each pattern element is varied in a region slightly wider than the light source width W, and the sectional shape outside the region is constant.

According to the simulation described above, while the light guide efficiency was 91% in the comparative example, the light guide efficiency was 96% in the second embodiment. Thus, it can be found that while 9% of light leaks from the light introducing part as a loss in the comparative example with a constant sectional shape of each pattern element, light leakage from the light introducing part is decreased to 4% in the first embodiment with the outward normal angle and the inward normal angle of each pattern element being varied while the vertical angle being kept constant.

Also, the constant vertical angle co of each pattern element as in the directional conversion pattern 36 of FIG. 14 eases the manufacture of a metal mold for molding. That is, when a metal mold for molding a light guide plate is fabricated, a V-grooved pattern of a metal mold is formed for a mount-shaped pattern element. If the vertical angle co of each pattern element is constant, when a metal mold is cut into V-grooved patterns in sequence by cutting with a tool, cutting it into the V grooves in sequence can be performed with the tilt of one tool for V grooves being changed, thereby easing the manufacture of a metal mold.

There are various modes to vary the sectional shape of each pattern element according to the distance G from the light source center C. For example, in the directional conversion pattern 36 depicted in FIG. 16A, the vertical angle co of each pattern element is gradually decreased as the pattern element are away from the light source center C. In the directional conversion pattern 36 depicted in FIG. 16B, the vertical angle co of each pattern element is gradually increased as the pattern element are away from the light source center C. FIG. 16C depicts the directional conversion pattern 36 in which pattern elements each having a curved surface are arrange, and the degree of curvature of each pattern element is gradually varied as the pattern elements are away from the light source center C.

While various shapes are possible as described above as the shape of the directional conversion pattern 36 in the second embodiment, as a result of tests and studies by the inventors of the present invention, it has been found that light guide efficiency higher than those of conventional products can be obtained if the following Condition 6 is satisfied, irrespectively of the shape of the directional conversion pattern 36. That is, when a value represented by $$\beta = -(\theta_1 - \theta_2)/(\theta_1 + \theta_2) + 0.782 \times (G/W) \quad \text{(Equation 7)}$$

is considered, light guide efficiency higher than those of conventional products can be obtained if the value of β is equal to or larger than −0.33 and equal to or smaller than 0.17. Here, θ1 and θ2 are an outward normal angle and an inward normal angle of adjacent pattern inclined surfaces 46a and 46b, respectively. G is a distance from the light source center C to each of the pattern inclined surfaces 46a and 46b. W is a light source width.

Figure 19:
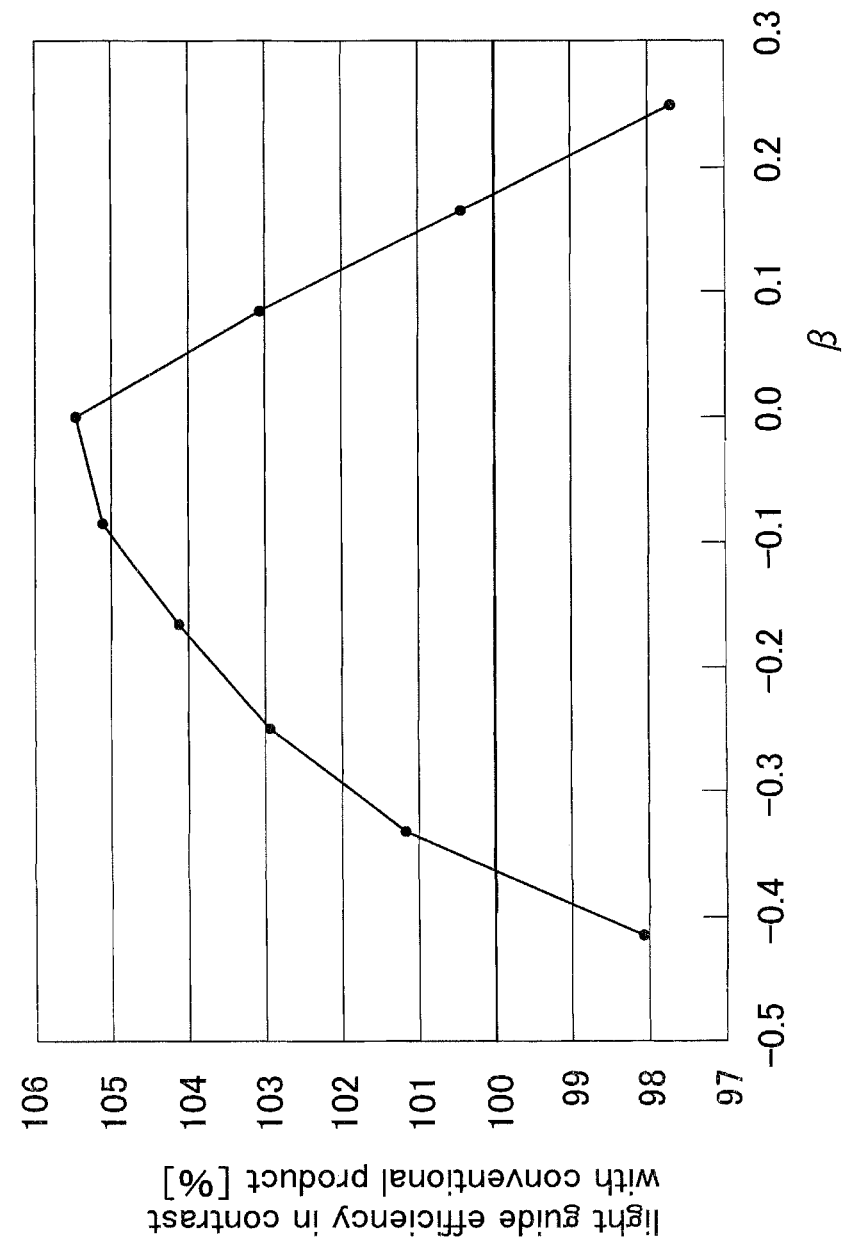
FIG. 19 is a diagram depicting a relation between a value β defined by Equation 7 and light guide efficiency with light guide efficiency of a conventional product being taken as 100%.

FIG. 19 is a diagram depicting a relation between the value β described above and light guide efficiency. The vertical axis of FIG. 19 is represented with the light guide efficiency of the light guide plate in contrast with conventional products (in which the same pattern elements that are laterally symmetrical are arranged) being taken as 100%. According to FIG. 19, it can be found that the light guide efficiency is the highest with β being approximately 0 and the light guide efficiency is improved more than those of conventional products when β is equal to or larger than −0.33 and equal to or smaller than 0.17.

Thus, when a ratio of a difference obtained by subtracting the inward normal angle from the outward normal angle, (θ1−θ2), with respect to a sum of the outward normal angle and the inward normal angle, (θ1+θ2), of adjacent pattern inclined surfaces 46a and 46b is C=(θ1−2)/(θ1+θ2) and a ratio of the distance G from the light source center C of the two inclined surfaces with respect to ½ of the open width W of the light source is B=G/(W/2), Equation 7 described above can be represented as $$C = +0.391 \times B + \beta \quad \text{(Equation 8), and}$$

light guide efficiency is improved more than those of conventional products if β is in a range of $$-0.33 \leq \beta \leq 0.17 \quad \text{(Condition 6).}$$

However, while Condition 6 is not a condition required for all pattern elements, pattern elements satisfying Condition 6 according to one or more embodiments of the present invention is as many as possible.

Figure 20:
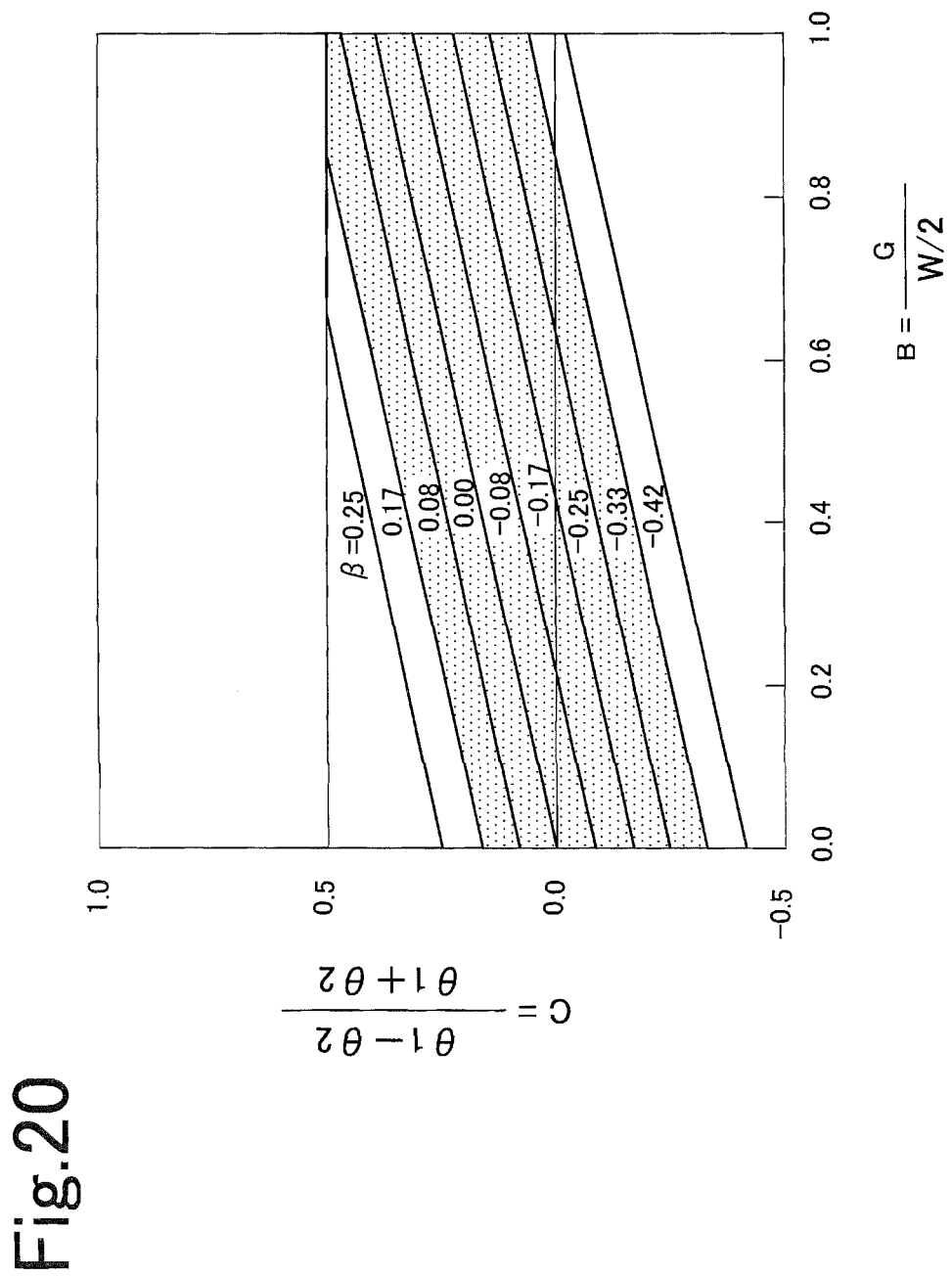
FIG. 20 is a diagram of a region with high light guide efficiency.

FIG. 20 is a diagram with the horizontal axis being set as B=G/(W/2) and the vertical axis being set as C=(θ1−θ2)/(θ1+θ2), having straight lines drawn with a value of β being −0.42 to 0.25. If a value is in a hatched region in this drawing, the light guide efficiency of the surface light source device is improved more than those of conventional products.

(Range of Vertical Angle)

Figure 21:
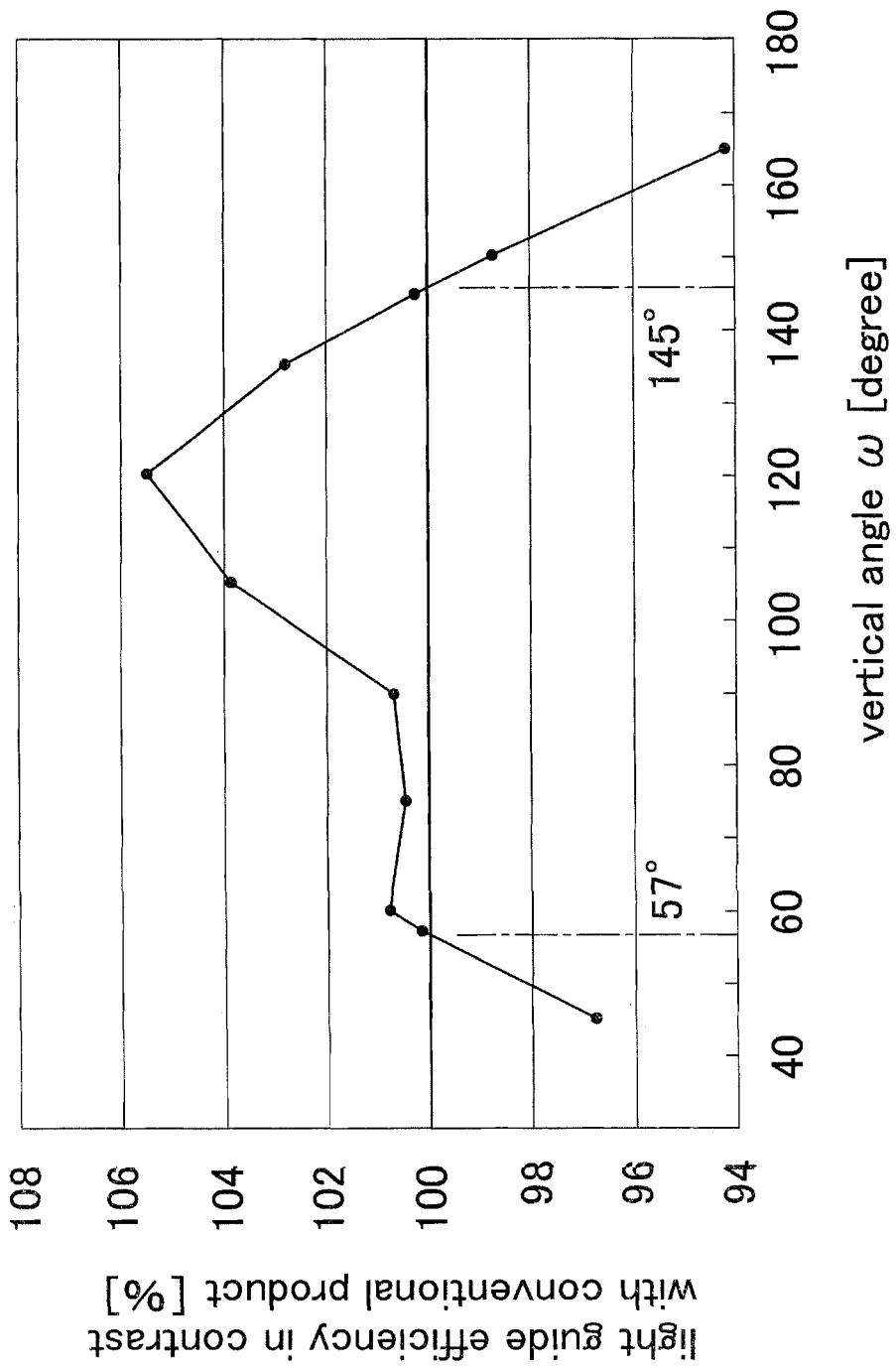
FIG. 21 is a diagram depicting a relation between a vertical angle of each pattern element and light guide efficiency with light guide efficiency of a conventional product being taken as 100%.

FIG. 21 is a diagram depicting a relation between the vertical angle ω and light guide efficiency of the directional conversion pattern 36 formed of mount-shaped or V-grooved pattern elements. The vertical axis of FIG. 21 is represented with the light guide efficiency of the light guide plate in contrast with conventional products (in which the same pattern elements that are laterally symmetrical are arranged) being taken as 100%. According to FIG. 21, it can be found that the light guide efficiency is the highest with the vertical angle ω being approximately 120° and the efficiency is improved more than those of conventional products if $$57° \leq \omega \leq 145°$$ (Equation 9).

Here, when a vertical angle of each pattern element is ω, an outward normal angle is θ1, and an inward normal angle is θ2, these have a relation of $$\omega + \theta_1 + \theta_2 = 180°.$$

By using this relation, Equation 9 is represented by $$57° \leq 180° - (\theta_1 + \theta_2) \leq 145°.$$

Therefore, in a portion of a section of the directional conversion pattern 36 obtained by cutting in parallel to the light incidence surface 38, the portion positioned being position in front of the point source of light 32 and in a region having the light source width W, if each pattern element of the directional conversion pattern 36 satisfies a condition of $$35° \leq (\theta_1 + \theta_2) \leq 123°,$$

light leakage from the directional conversion pattern 36 can be reduced to improve light use efficiency.

Figure 22:
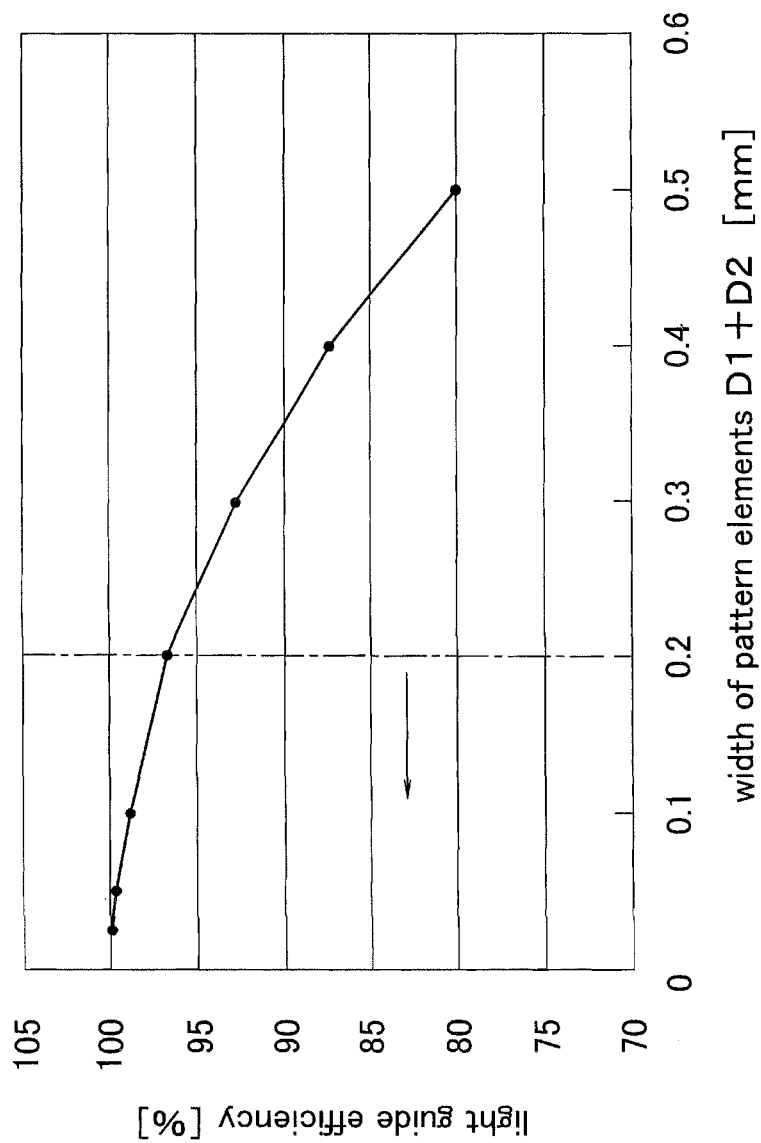
FIG. 22 is a diagram depicting a relation between a width of each pattern element and light guide efficiency.

FIG. 22 is a diagram of evaluation results of the relation between the width (D1+D2) of the pattern element and light guide efficiency with a simulation. A model used in this simulation is a light guide plate with a difference (T−t) between the thickness T of the light introducing part 35 and the thickness t of the light guide plate main body 34 being 0.19 mm, the vertical angle ω being an optimum angle of 120°, and a length of the directional conversion pattern 36 (a length in a direction perpendicular to the light incidence surface 38) being 1.5 mm. In FIG. 22, light guide efficiency decrease as the width (D1+D2) of the pattern element increases, because when the width of the pattern element increases, an inclined surface without a pattern element increases in the light introducing part 35 depending on the method of fabricating the directional conversion pattern 36. Parameters in the simulation are by way of example when a decrease in efficiency is large due to an increase in the width of the pattern element. According to FIG. 22, according to one or more embodiments of the present invention to suppress the percentage of the decrease in light guide efficiency below 10%, the width (D1+D2) of the pattern element is equal to or smaller than 0.33 mm. In particular, it is desired to suppress the percentage of the decrease in light guide efficiency below 5%, and therefore the width of the pattern element according to one or more embodiments of the present invention is equal to or smaller than 0.2 mm.

(Surface Light Source Device with a Plurality of Point Sources of Light)

Figure 23:
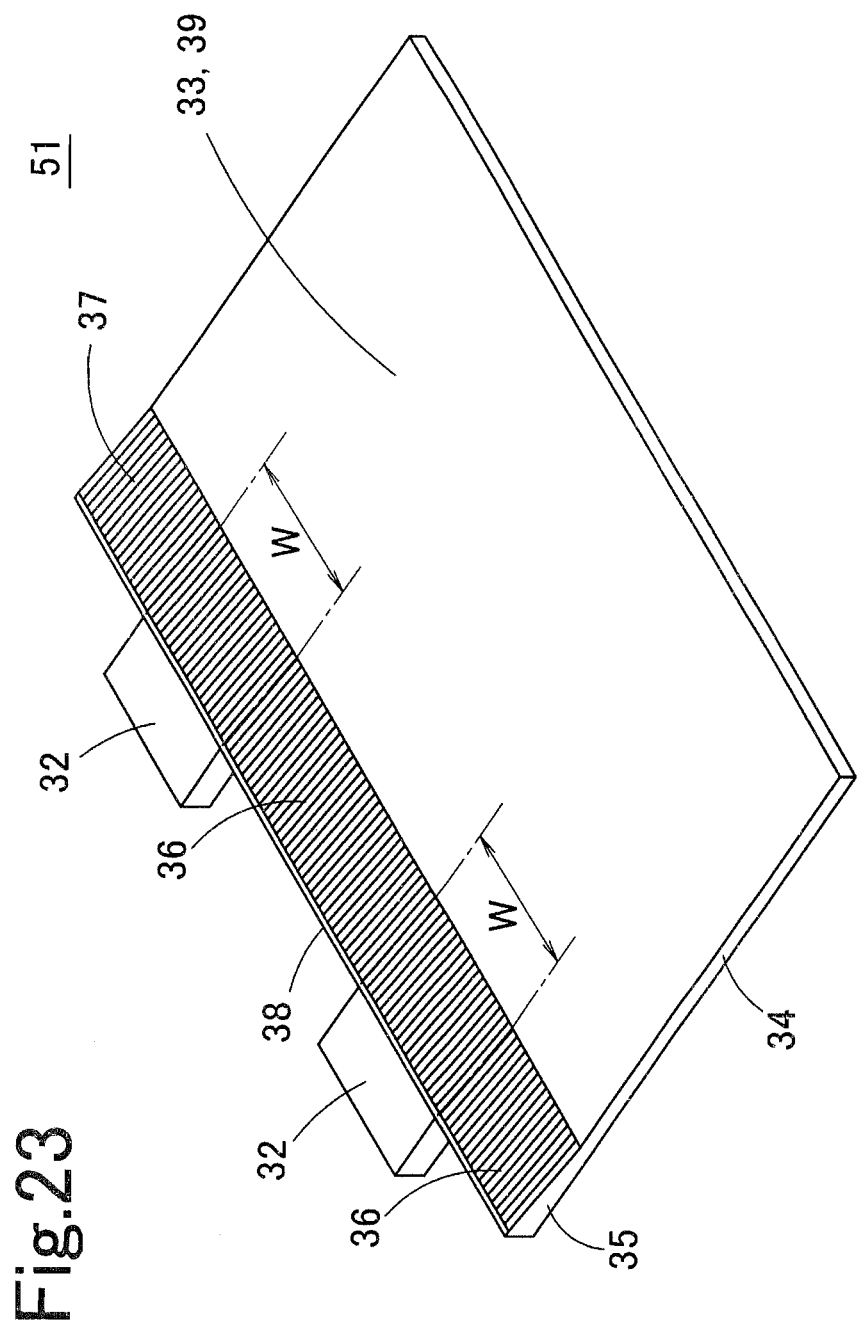
FIG. 23 is a perspective view of a surface light source device having two point sources of light.
Figure 24:
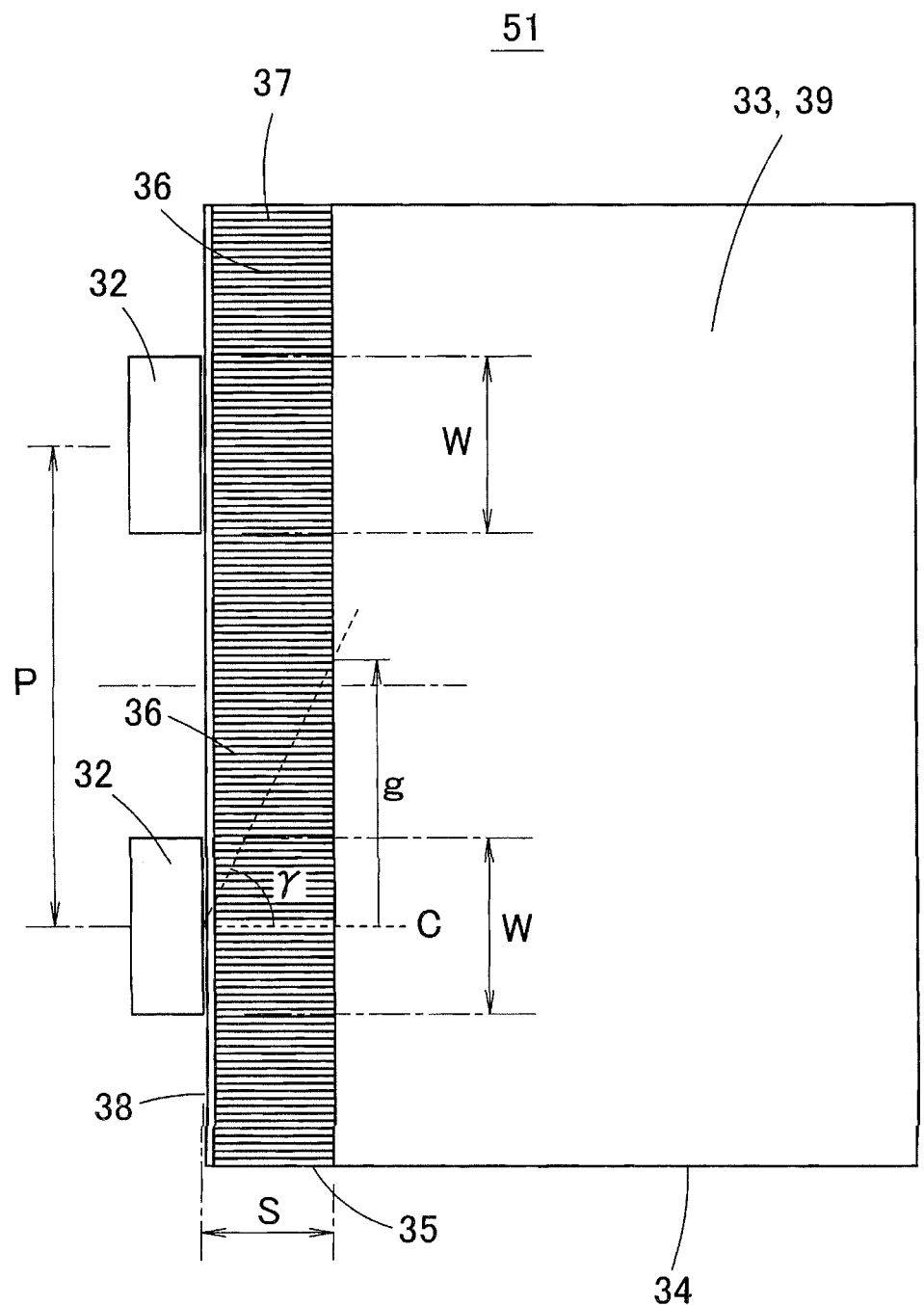
FIG. 24 is a plan view of the surface light source device depicted in FIG. 23.

Next, a surface light source device 51 with a plurality of point sources of light 32 is described. FIG. 23 is a perspective view of the surface light source device 51 having the plurality of point sources of light 32 so as to face the light incidence surface 38 of the light guide plate 33. FIG. 24 is a plan view of the surface light source device 51. In this surface light source device 51, with an intermediate portion between the point source of light 32 and the point source of light 32 as a boundary, the same directional conversion pattern 36 is cyclically formed with the same cycles as the pitch P of the point sources of light 32. For example, the pitch P of the point sources of light 32 is 5.5 mm, and the cycle W of the directional conversion pattern 36 is also 5.5 mm.

As such, when the plurality of point sources of light 32 are arranged, rays from the point sources of light 32 on both sides may reach the intermediate portion between adjacent point sources of light 32 in the directional conversion pattern 36. When rays from the point sources of light 32 on both sides simultaneously enter a portion of the directional conversion pattern 36, both rays cannot be optimally designed so that light leakage is made less prone to occur, thereby degrading light use efficiency of the surface light source device.

Therefore, rays from the plurality of point sources of light 32 according to one or more embodiments of the present invention are made so as not to enter the directional conversion pattern 36. An angle of incidence γ of light emitted from the point source of light 32 and entering the light introducing part 35 from the light incidence surface 38 is represented as $$\gamma = \arcsin(1/n)$$ (Equation 10)

according to Fresnel's Law, where n is a refractive index of the light guide plate 33. Thus, light spread in the light introducing part 35 is in a range of γ on left and right with the light source center C as a center, as depicted in FIG. 24. A spread g of light in a lateral direction in the directional conversion pattern 36 is represented by $$g = S \tan \gamma \approx S \cdot \gamma = S \cdot \arcsin(1/n)$$ (Equation 11)

from FIG. 24 and Equation 10 described above. To prevent light introduced from the light source center C in a γ direction from entering an adjacent region, it is sufficient that this spread g in the lateral direction is smaller than ½ of a pitch P of the point sources of light 32, and therefore $$g \leq P/2$$ (Condition 7), where S is a distance measured from the end face (the light-emitting surface) of each point source of light 32 to an end of the directional conversion pattern 36. Thus, a condition for preventing light from reaching the directional conversion pattern 36 from two directions is represented by $$S \leq P/[2 \cdot \arcsin(1/n)]$$ (Condition 8)

from Equation 11 and Condition 7 described above.

Therefore, when the plurality of point sources of light 32 are used, the distance S measured from the end face of each point source of light 32 to the end of the directional conversion pattern 36 is determined so as to satisfy the condition of $$S \leq P/[2 \cdot \arcsin(1/n)].$$

With this, the directional conversion pattern 36 can be optimally designed, decreasing light leakage and increasing light use efficiency. For example, when the pitch of the point sources of light 32 is set as P=5.5 mm and the refractive index of the light guide plate 33 is set as n=1.59 (polycarbonate resin), $$J \leq \text{approximately 4 mm},$$

and it is sufficient that the length of a region provided with the directional conversion pattern 36 is equal to or smaller than approximately 4 mm.

Figure 25:
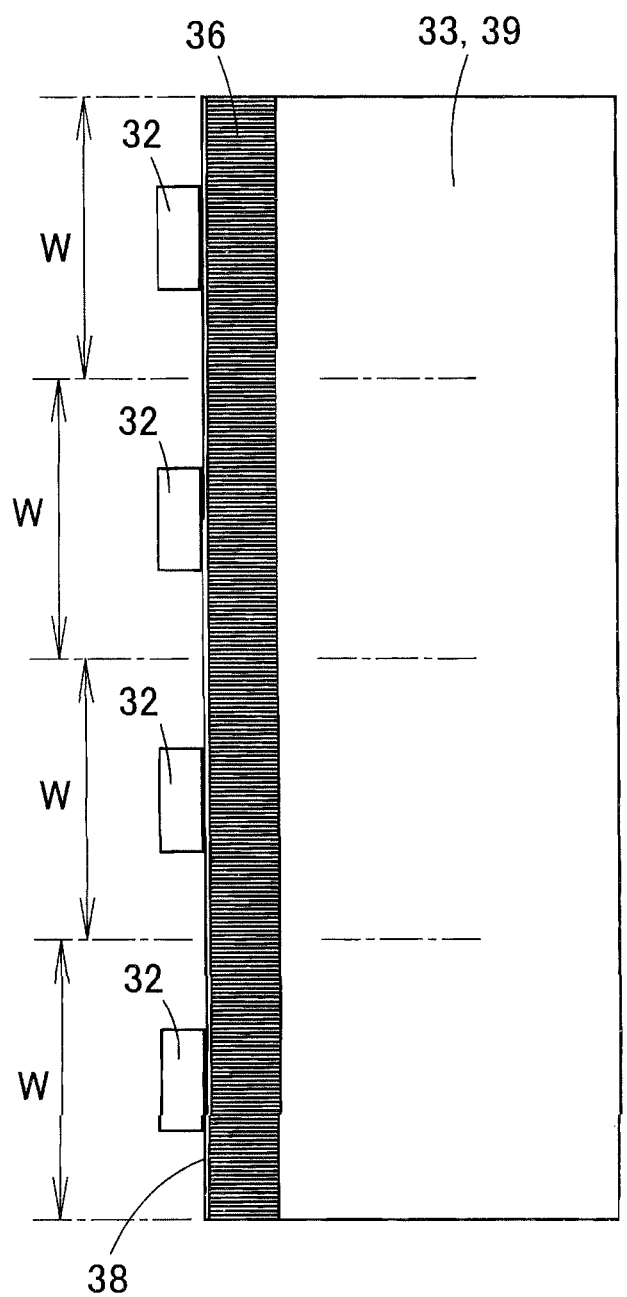
FIG. 25 is a plan view of an example of a surface light source device having a plurality of point sources of light.
Figure 26:
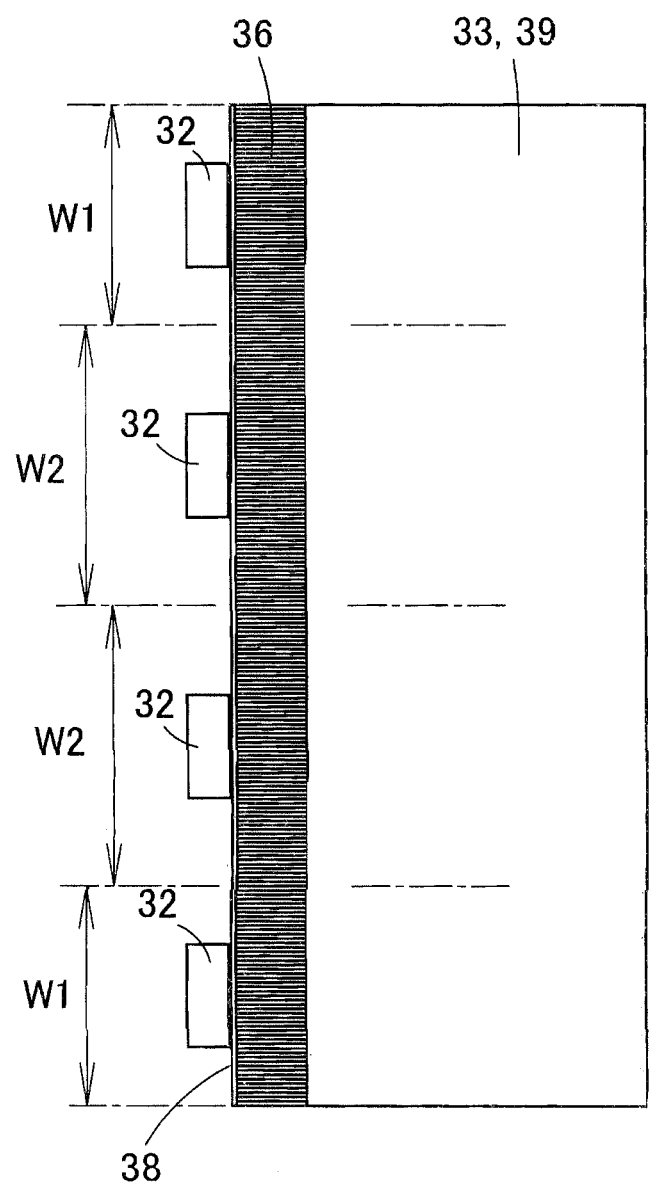
FIG. 26 is a plan view of another example of the surface light source device having a plurality of point sources of light.
Figure 27:
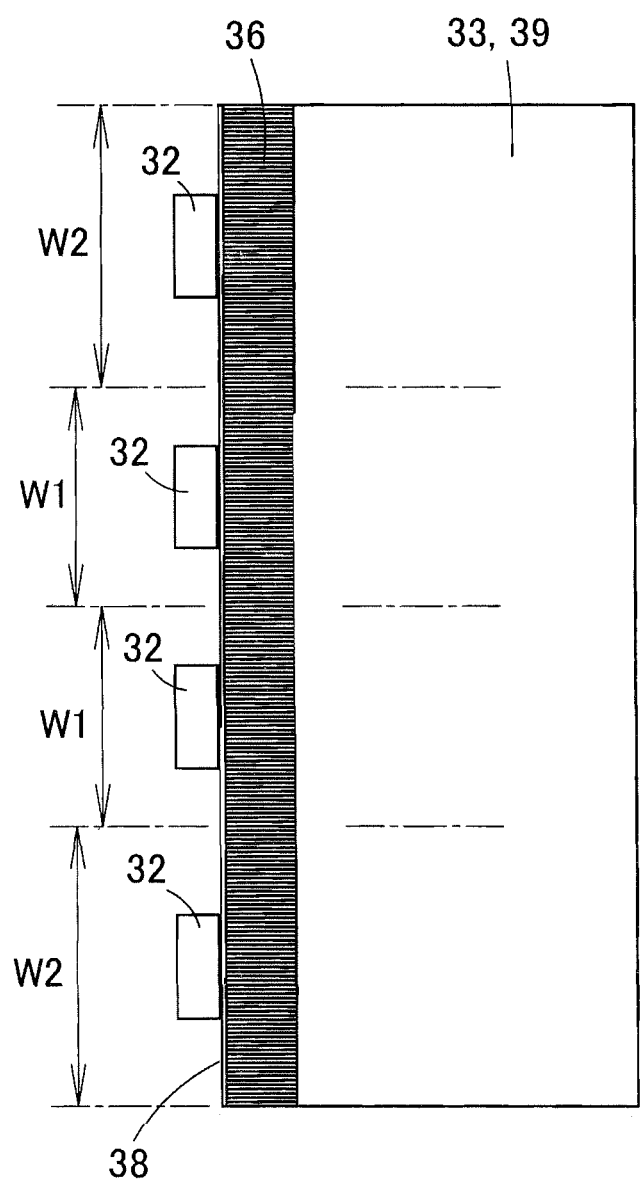
FIG. 27 is a plan view of still another example of the surface light source device having a plurality of point sources of light.
Figure 28:
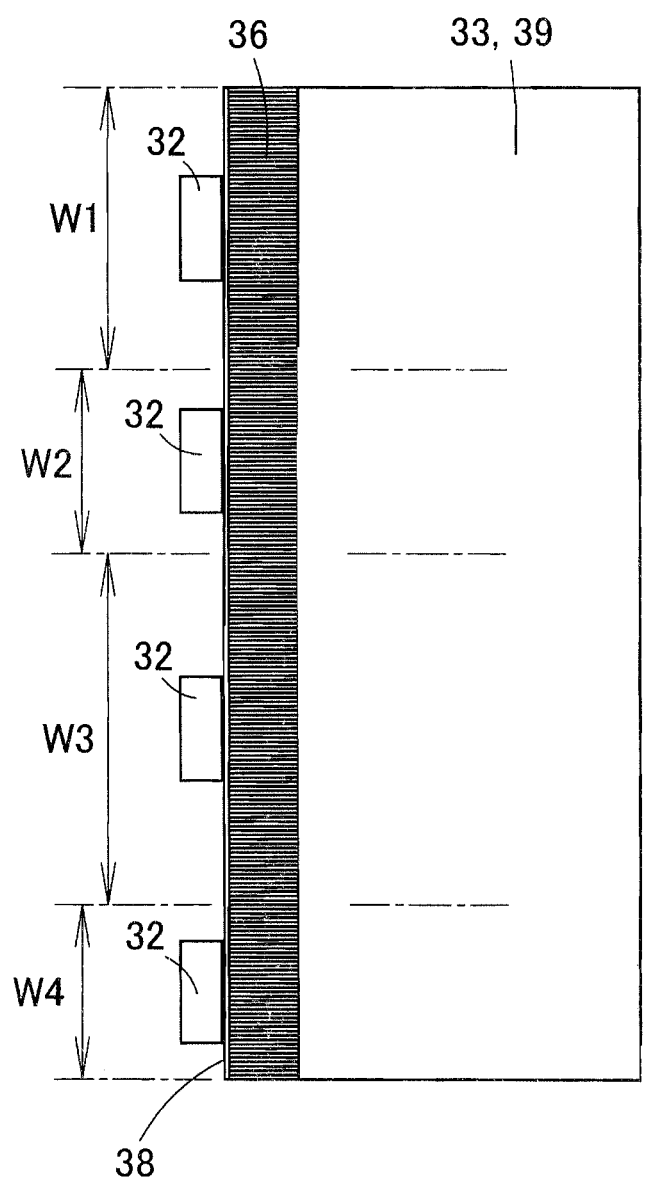
FIG. 28 is a plan view of still another example of the surface light source device having a plurality of point sources of light.

As a mode in which the plurality of point sources of light 32 are arranged so as to face the light incidence surface 38 of the light guide plate 33, as depicted in FIG. 25, a basic structure is such that the plurality of point sources of light 32 are arranged with uniform pitches, and a cycle W of the directional conversion pattern 36 for each point source of light 32 is uniform. However, as depicted in FIG. 26, the point sources of light 32 at both ends may be arranged with short pitches, and a cycle W1 of the directional conversion pattern 36 for the point sources of light 32 at both ends may be shorter than a cycle W2 of other portions. Conversely, as depicted in FIG. 27, the point sources of light 32 at both ends may be arranged with long pitches, and a cycle W2 of the directional conversion pattern 36 for the point sources of light 32 at both ends may be longer than a cycle W1 of other portions. Furthermore, as depicted in FIG. 28, the pitches of the point sources of light 32 and cycles W1, W2, W3, and W4 of the directional conversion pattern 36 for each point source of light 32 may be determined in a random manner.

(Various Modes of Directional Conversion Pattern)

FIG. 29A to FIG. 29C and FIG. 30A to FIG. 30C are schematic plan views of various modes of the directional conversion pattern 36. As depicted herein, the directional conversion pattern 36 can also be formed in various shapes.

Figure 29A:
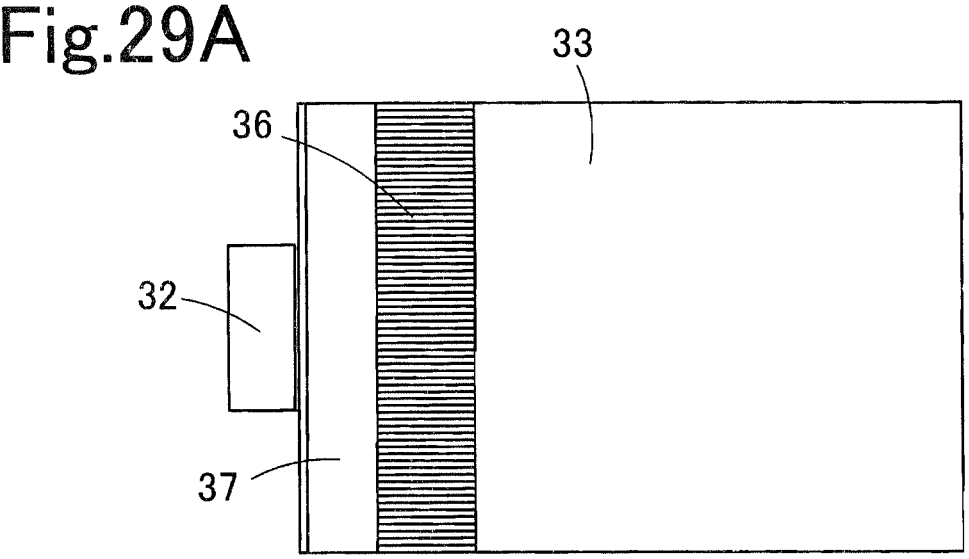
FIG. 29A to FIG. 29C are schematic plan views of various directional conversion patterns.
Figure 29B:
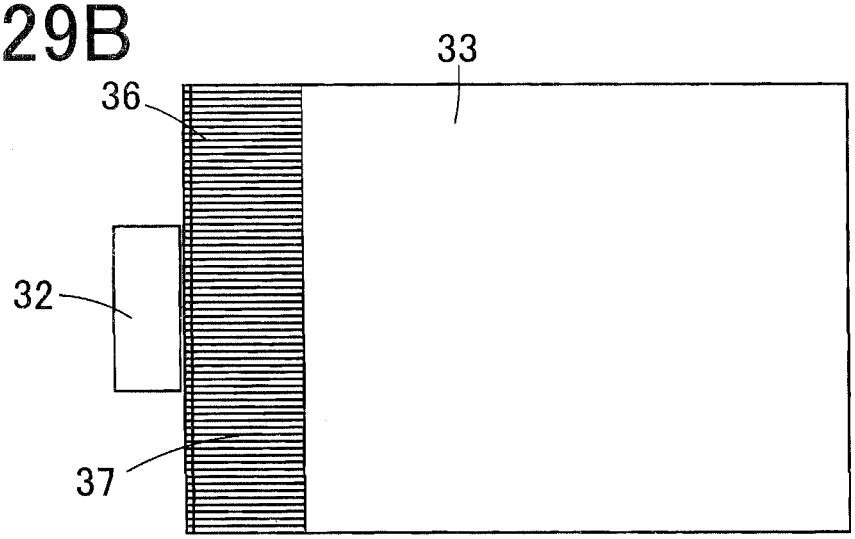
Figure 29C:
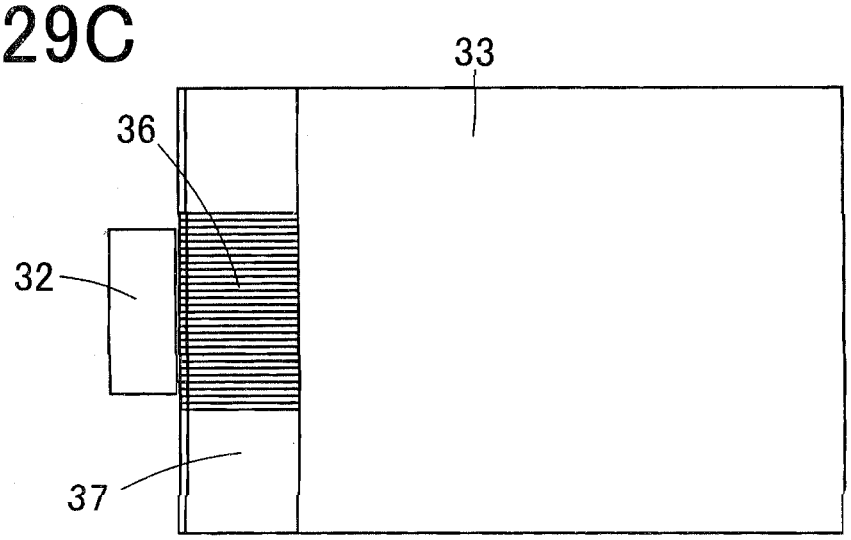

In the light guide plate 33 depicted in FIG. 29A, the directional conversion pattern 36 is provided from a midpoint of the inclined surface 37 to the lower end of the inclined surface 37, and the upper surface of the inclined surface 37 is a flat surface. In the light guide plate 33 depicted in FIG. 29B, the directional conversion pattern 36 is provided on the entire upper surface of the light introducing part 35. In the light guide plate 33 depicted in FIG. 29C, the directional conversion pattern 36 is provided only at the center part of the inclined surface 37 positioned in front of the point source of light 32.

In the light guide plate 33 depicted in FIG. 30A, an edge on a lower side of a region where the directional conversion pattern 36 is formed is bent or curved in a projecting manner. In the light guide plate 33 depicted in FIG. 30B, the pattern elements of the directional conversion pattern 36 are arranged not in parallel to each other but, for example, radially. The directional conversion pattern 36 depicted in FIG. 30C is configured of pattern elements bent in a zigzag manner.

(Various Modes of Light Guide Plate)

FIG. 31A to FIG. 31C, FIG. 32A to FIG. 32C, FIG. 33A to FIG. 33C, and FIG. 34A to FIG. 34C are schematic side views of various shapes of the light guide plate 33. The effect according to one or more embodiments of the present invention can be achieved also by using these light guide plates.

Figure 31A:
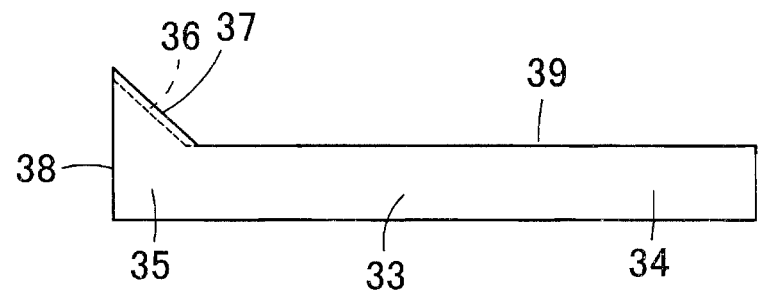
FIG. 31A to FIG. 31C are schematic side views of various embodiments of a light guide plate.
Figure 31B:
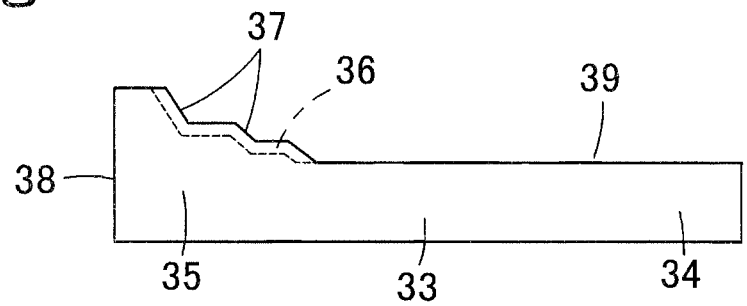
Figure 31C:
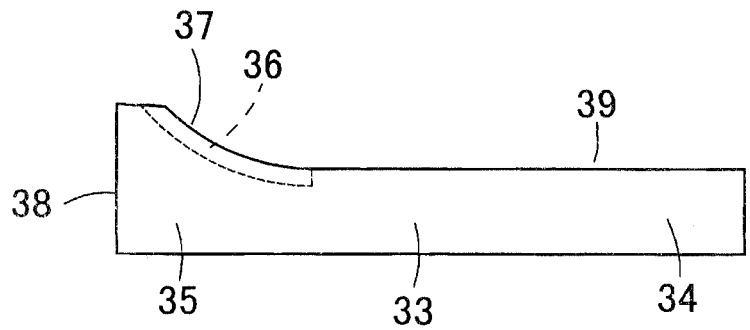

In the one depicted in FIG. 31A, a horizontal portion at the end of the light introducing part 35 is eliminated, and the inclined surface 37 starts from the light incidence surface 38. In the one depicted in FIG. 31B, a plurality of inclined surfaces 37 are provided to the light introducing part 35 are provided. In the one depicted in FIG. 31C, the inclined surface 37 of the light introducing part 35 is a curved surface.

Figure 32A:
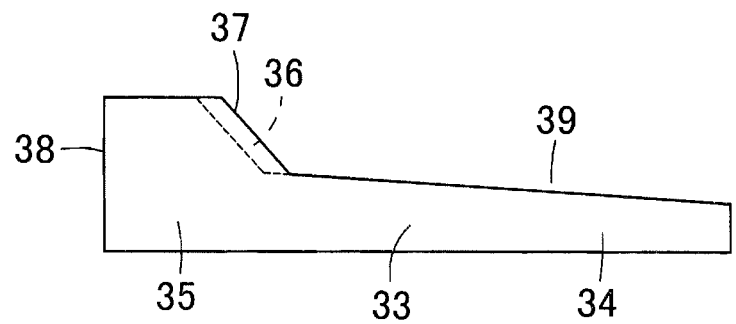
FIG. 32A to FIG. 32C are schematic side views of various embodiments of a light guide plate.
Figure 32B:
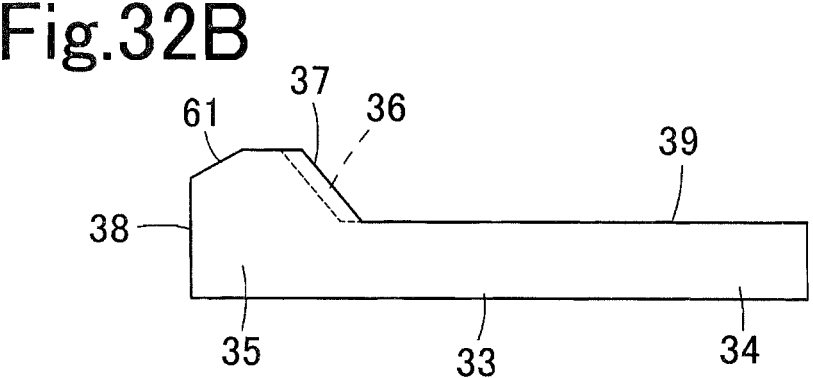
Figure 32C:
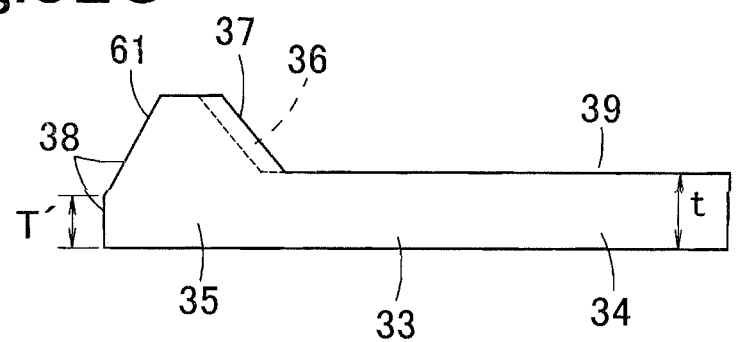

In the one depicted in FIG. 32A, the upper surface of the light guide plate main body 34 is inclined to form the light guide plate main body 34 in a tapered shape. In those depicted in FIG. 32B and FIG. 32C, an end of the upper surface of the light introducing part 35 on a light incidence surface 38 side is inclined to a direction opposite to the inclined surface 37 to provide an inverted inclined part 61. In particular, in FIG. 32C, with the provision of the inverted inclined part 61, a height T' of the end of the light introducing part 35 is smaller than the thickness t of the light guide plate main body 34.

Figure 33A:
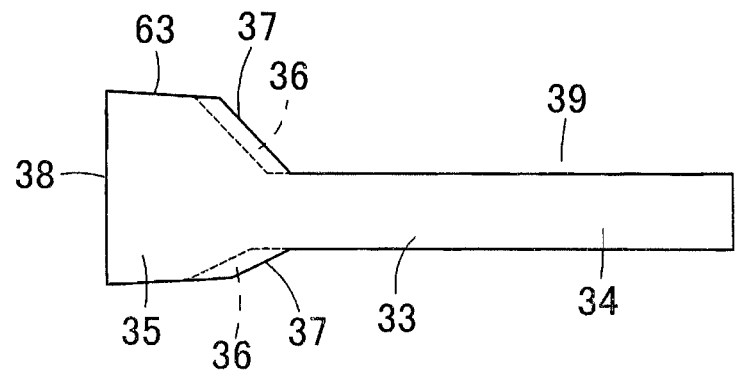
FIG. 33A to FIG. 33C are schematic side views of various embodiments of the light guide plate.
Figure 33B:
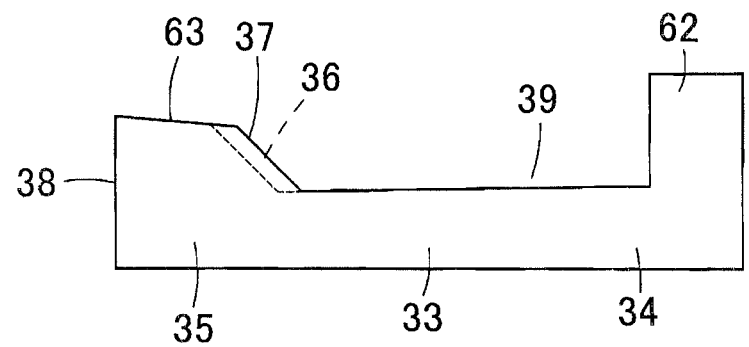

In the one depicted in FIG. 33A, an inclined surface 37 is provided on each of upper and lower surfaces of the light introducing part 35, and one or both of the inclined surfaces 37 are provided with the directional conversion pattern 36. As depicted in FIG. 33B, a portion 62 larger than the thickness of the light introducing part 35 may be provided to part of the light guide plate main body 34.

Also, as depicted in FIG. 33A and FIG. 33B, a gently inclined surface 63 may be provided by gently inclining the uppermost surface of the light introducing part 35.

Figure 33C:
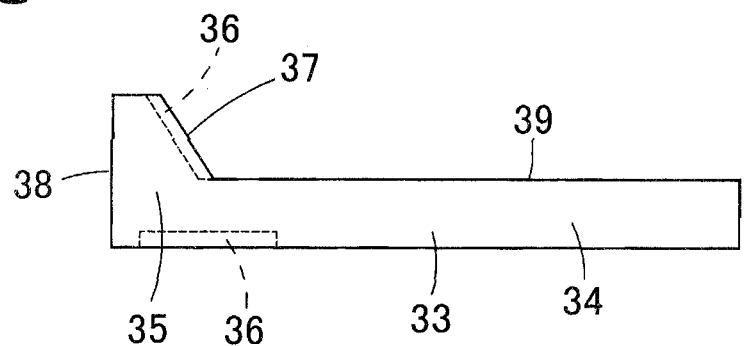
Figure 34A:
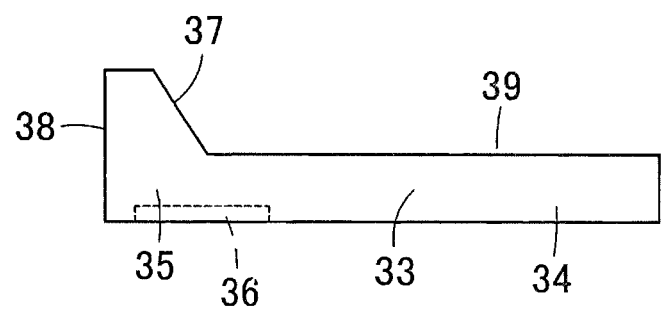
FIG. 34A to FIG. 34C are schematic side views of various embodiments of the light guide plate.

In FIG. 33C, the directional conversion pattern 36 is provided on each of the inclined surface 37 and the lower surface of the light introducing part 35. In FIG. 34A, the directional conversion pattern 36 is provided only on the lower surface of the light introducing part 35. As depicted in FIG. 33C and FIG. 34A, the directional conversion pattern 36 provided on the lower surface of the light introducing part 35 may extend to the lower surface of the light guide plate main body 34.

Figure 34B:
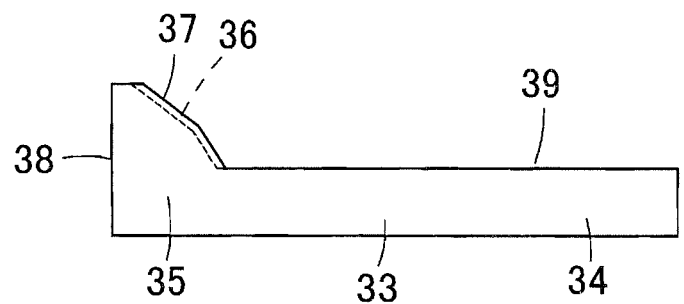
Figure 34C:
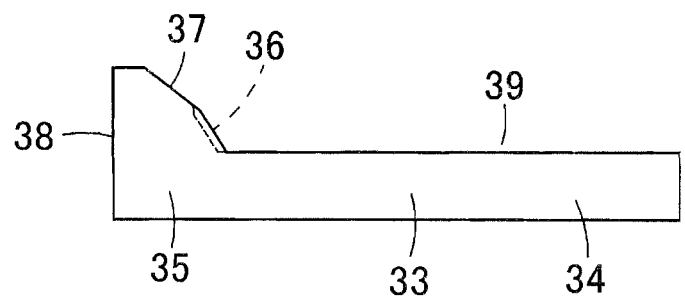

In the light guide plate 33 of each of FIG. 34B and FIG. 34C, the inclined surface 37 is formed with two stages by varying the tilt of the inclined surface 37 at a midpoint. In the light guide plate 33 of FIG. 34B, the directional conversion pattern 36 is provided over the entire inclined surface 37. In the light guide plate 33 of FIG. 34C, the directional conversion pattern 36 is provided to only a lower half of the inclined surface 37.

Note that while one light source is used in the embodiments and modification examples described above, a plurality of point sources of light may be arranged so as to face the light incidence surface of the light guide plate. In this case, it is sufficient that directional conversion patterns configured as described above or the like are repeatedly provided at spacings equal to the arrangement pitches of the point sources of light so as to correspond to the positions of the respective point sources of light.

Also, while the directional conversion pattern is provided on the upper surface of the light guide plate in the embodiments and modification examples described above, the directional conversion pattern may be provided on the lower surface of the light guide plate or on both of the upper surface and the lower surface of the light guide plate.

Note that the inclined surface 37 may be provided on a surface (the lower surface) opposite to the light exit surface 39.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A surface light source device comprising:
a light source; and
a light guide plate introducing light of the light source from a light incidence surface and emitting the light from a light exit surface to outside,
wherein the light source is provided at a position facing the light incidence surface of the light guide plate,
wherein the light guide plate comprises a light introducing part for enclosing the light from the light source entering from the light incidence surface and a light guide plate main body having a thickness smaller than a maximum thickness of the light introducing part, provided so as to be continued to the light introducing part, and emitting the enclosed light from the light exit surface by a light emitting portion to outside,
wherein the light introducing part comprises an inclined surface inclined from a surface of a portion having a thickness larger than a thickness of the light guide plate main body toward an end of a surface of the light guide plate main body, the inclined surface being provided on at least one of a surface of the light guide plate on a light emission side and a surface opposite thereto,
wherein the light guide plate comprises a directional conversion pattern for converting a directional spread of the light entering the light introducing part in a thickness direction of the light guide plate into a directional characteristic inclined to a direction parallel to a surface direction of the light guide plate, the directional conversion pattern being provided on at least one of the surface of the light guide plate on the light emission side and the surface opposite thereto, wherein the directional conversion pattern is configured so that ridge lines and valley lines are alternately repeated along a width direction of the light guide plate, and wherein, of a cross-section of the directional conversion pattern obtained by cutting in parallel to the light incidence surface, in a portion positioned in front of the light source and in a region having a width equal to a width of the light source:

an inclined surface connecting any ridge line of the ridge lines of the directional conversion pattern and one valley line adjacent to the ridge line and an inclined surface connecting the ridge line and another valley line adjacent to the ridge line being asymmetrical with respect to a straight line passing though the ridge line and perpendicular to the light exit surface, and at least one set of the asymmetrically-shaped portions of different shapes being present on both sides of a light source center, and in each of both sides of the light source center, when a normal is set on an inclined surface connecting adjacent ridge line and valley line of the directional conversion pattern from inside to outside of the light guide plate, a total sum of breadths of inclined surfaces each with the normal inclined to a light source center side is larger than a total sum of breadths of inclined surfaces each with the normal inclined to a side opposite to the light source center.

2. The surface light source device according to claim 1, wherein, in the adjacent two inclined surfaces, a breadth of an inclined surface with the normal inclined to the light source center side is larger than or equal to a breadth of an inclined surface with the normal inclined to the side opposite to the light source center.

3. The surface light source device according to claim 1, wherein a ratio of the breadths of the inclined surfaces each with the normal inclined to the side opposite to the light source center with respect to the sum of the breadths of the adjacent two inclined surfaces is decreased or equal as a distance from the light source center is increased.

4. The surface light source device according to claim 1, wherein, when $A=-0.456 \times B+\alpha$, where a ratio of breadth of the inclined surface with the normal inclined to the side opposite to the light source center with respect to the sum of the breadths of the adjacent two inclined surfaces is A, and where a ratio of distance of the adjacent two inclined surfaces from the light source center with respect to ½ of an open width of the light source is B, a value of the $\alpha$ is in a range of $0.3 \leq \alpha \leq 0.9$.

5. A surface light source device comprising:
a light source; and
a light guide plate introducing light of the light source from a light incidence surface and emitting the light from a light exit surface to outside,
wherein the light source is provided at a position facing the light incidence surface of the light guide plate,
wherein the light guide plate comprises a light introducing part for enclosing the light from the light source entering from the light incidence surface and a light guide plate main body having a thickness smaller than a maximum thickness of the light introducing provided so as to be continued to the light introducing part, and emitting the enclosed light from the light exit surface by a light emitting portion to outside,
wherein the light introducing part comprises an inclined surface inclined from a surface of a portion having a thickness larger than a thickness of the light guide late main body toward an end of a surface of the light guide plate main body, the inclined surface being provided on at least one of a surface of the light guide plate on a light emission side and a surface opposite thereto, wherein the light guide plate comprises a directional conversion pattern for converting a directional spread of the light entering the light introducing part in a thickness direction of the light guide plate into a directional characteristic inclined to a direction parallel to a surface direction of the light guide plate, the directional conversion pattern being provided on at least one of the surface of the light guide plate on the light emission side and the surface opposite thereto, wherein the directional conversion pattern is configured so that ridge lines and valley lines are alternately repeated along a width direction of the light guide plate, and wherein, of a cross-section of the directional conversion pattern obtained by cutting in parallel to the light incidence surface, in a portion positioned in front of the light source and in a region having a width equal to a width of the light source, an inclined surface connecting any ridge line of the ridge lines of the directional conversion pattern and one valley line adjacent to the ridge line and an inclined surface connecting the ridge line and another valley line adjacent to the ridge line being asymmetrical with respect to a straight line passing though the ridge line and perpendicular to the light exit surface, and at least one set of the asymmetrically-shaped portions of different shapes being present on both sides of a light source center, and in each of both sides of the light source center, when a normal is set on an inclined surface connecting adjacent ridge line and valley line of the directional conversion pattern from inside to outside of the light guide plate, an average angle of angles each formed by the normal inclined to the light source center side and a direction perpendicular to the light exit surface is smaller than an average angle of angles each formed by the normal inclined to the side opposite to the light source center and a direction perpendicular to the light exit surface.

6. The surface light source device according to claim 5, wherein, in the two adjacent inclined surfaces, an angle formed by the normal inclined to the light source center side and the direction perpendicular to the light exit surface is smaller than or equal to an angle formed by the normal inclined to the side opposite to the light source center and the direction perpendicular to the light exit surface.

7. The surface light source device according to claim 5, wherein an angle formed by the normal inclined to the light source center side and the direction perpendicular to the light exit surface is decreased or equal as a distance from the light source center is increased.

8. The surface light source device according to claim 5, wherein an angle formed by the normal inclined to the side opposite to the light source center and the direction perpendicular to the light exit surface is increased or equal as a distance from a light source center is increased.

9. The surface light source device according to claim 5, wherein, when $C=+0.391\beta B+\beta$, where a ratio of difference obtained by subtracting the angle formed by the normal inclined to the light center side among the normal of the adjacent two includes surfaces and the direction perpendicular to the light exit surface from the angle formed by the normal inclined to the side opposite to the light source center among the normal of the adjacent two inclined surfaces and the direction perpendicular to the light exit surface, with respect to a sum of the angle formed by the normal inclined to the side opposite to the light source center among the normal of adjacent two inclined surfaces and the direction perpendicular to the light exit surface and the angle formed by the normal inclined to the light source center side among the normal of the adjacent two inclined surfaces and the direction perpendicular to the light exit surface is C, and where a ratio of distance of the adjacent two inclined surfaces from the light source center with respect to ½ of an open width of the light source is B, a value of the β is in a range of −0.33≤β≤0.17.

10. The surface light source device according to claim 1, wherein the directional conversion pattern has a plurality of pattern elements arranged along the width direction of the light guide plate, and wherein, in each region on both sides of the light source center, the pattern elements convert a directional characteristic of light by reflecting light into the light guide plate so that quantity of light oriented to the side opposite to the light source center after reflection is more than before reflection.

11. The surface light source device according to claim 1, wherein, in regions on both sides of the light source center, a sum of an angle formed by the normal inclined to the light source center side and the direction perpendicular to the light exit surface and an angle formed by the normal inclined to the side opposite to the light source center and the direction perpendicular to the light exit surface is equal to or larger than 35° and equal to or smaller than 123°.

12. The surface light source device according to claim 11, wherein the directional conversion pattern is configured of a plurality of V-grooved pattern elements.

13. The surface light source device according to claim 12, wherein every vertical angle of all of ridge line portions formed between the adjacent two V-grooved pattern elements is the same.

14. The surface light source device according to claim 1, wherein a plurality of the light sources are placed at positions facing the light incidence surface and arranged along the light incidence surface with a space P, and wherein, when a refractive index of the light guide plate is n, the directional conversion pattern is present in a region of the light guide plate at a distance equal to or shorter than $$P/[2\cdot\arcsin(1/n)]$$

from a light exit side end face of the light source.

15. The surface light source device according to claim PE 1, wherein a plurality of the light sources are placed at positions facing the light incidence surface, and wherein the directional conversion pattern is cyclically configured with an approximately center between adjacent ones of the light sources being taken as a boundary.

16. The surface light source device according to claim 1, wherein, when viewed in a direction perpendicular to the light exit surface, the directional conversion pattern is configured of a plurality of pattern elements aligned in parallel.

17. The surface light source device according to claim 1, wherein, in regions on both sides of the light source center, a sum of an angle formed by the normal inclined to the light source center side and the direction perpendicular to the light exit surface and an angle formed by the normal inclined to the side opposite to the light source center and the direction perpendicular to the light exit surface is equal to or larger than 35° and equal to or smaller than 123°.

18. The surface light source device according to claim 2, wherein, in regions on both sides of the light source center, a sum of an angle formed by the normal inclined to the light source center side and the direction perpendicular to the light exit surface and an angle formed by the normal inclined to the side opposite to the light source center and the direction perpendicular to the light exit surface is equal to or larger than 35° and equal to or smaller than 123°.

19. The surface light source device according to claim 3, wherein, in regions on both sides of the light source center, a sum of an angle formed by the normal inclined to the light source center side and the direction perpendicular to the light exit surface and an angle formed by the normal inclined to the side opposite to the light source center and the direction perpendicular to the light exit surface is equal to or larger than 35° and equal to or smaller than 123°.

20. The surface light source device according to claim 5, wherein the directional conversion pattern has a plurality of pattern elements arranged along the width direction of the light guide plate, and wherein, in each region on both sides of the light source center, the pattern elements convert a directional characteristic of light by reflecting light into the light guide plate so that quantity of light oriented to the side opposite to the light source center after reflection is more than before reflection.

21. The surface light source device according to claim 5, wherein, in regions on both sides of the light source center, a sum of an angle formed by the normal inclined to the light source center side and the direction perpendicular to the light exit surface and an angle formed by the normal inclined to the side opposite to the light source center and the direction perpendicular to the light exit surface is equal to or larger than 35° and equal to or smaller than 123°.

22. The surface light source device according to claim 5, wherein a plurality of the light sources are placed at positions facing the light incidence surface and arranged along the light incidence surface with a space P, and wherein, when a refractive index of the light guide plate is n, the directional conversion pattern is present in a region of the light guide plate at a distance equal to or shorter than $$P/[2\cdot\arcsin(1/n)]$$

from a light exit side end face of the light source.

23. The surface light source device according to claim 5, wherein a plurality of the light sources are placed at positions facing the light incidence surface, and wherein the directional conversion pattern is cyclically configured with an approximately center between adjacent ones of the light sources being taken as a boundary.

24. The surface light source device according to claim 5, wherein, when viewed in a direction perpendicular to the light exit surface, the directional conversion pattern is configured of a plurality of pattern elements aligned in parallel.

* * * * *